United States Patent
Leuthardt et al.

(10) Patent No.: US 12,499,997 B2
(45) Date of Patent: Dec. 16, 2025

(54) SYSTEMS AND METHODS FOR PRODUCING A BRAIN LESION FUNCTIONAL MRI BIOMARKER, PREDICTING PATIENT PROGNOSIS, AND TREATMENT PLANNING

(71) Applicant: Washington University, St. Louis, MO (US)

(72) Inventors: Eric Leuthardt, St. Louis, MO (US); Andy Daniel, St. Louis, MO (US)

(73) Assignee: Washington University, St. Louis, MO (US)

( * ) Notice: Subject to any disclaimer, the term of this patent is extended or adjusted under 35 U.S.C. 154(b) by 811 days.

(21) Appl. No.: 17/763,421

(22) PCT Filed: Sep. 25, 2020

(86) PCT No.: PCT/US2020/052782
§ 371 (c)(1),
(2) Date: Mar. 24, 2022

(87) PCT Pub. No.: WO2021/062195
PCT Pub. Date: Apr. 1, 2021

(65) Prior Publication Data
US 2022/0399117 A1    Dec. 15, 2022

Related U.S. Application Data

(60) Provisional application No. 62/905,884, filed on Sep. 25, 2019.

(51) Int. Cl.
*G16H 50/20* (2018.01)
*A61B 5/00* (2006.01)
(Continued)

(52) U.S. Cl.
CPC ............ *G16H 50/20* (2018.01); *A61B 5/055* (2013.01); *A61B 5/4064* (2013.01);
(Continued)

(58) Field of Classification Search
CPC ........ G16H 50/20; G16H 30/40; G16H 50/30; G16H 30/20; A61B 5/055; A61B 5/4064;
(Continued)

(56) References Cited

U.S. PATENT DOCUMENTS

| 10,034,645 B1* | 7/2018 | Williams | G06T 3/18 |
| 2015/0119689 A1* | 4/2015 | Pascual-Leone | A61N 2/006 |
| | | | 600/407 |

(Continued)

OTHER PUBLICATIONS

Overall survival time prediction for high-grade glioma patients based on large-scale brain functional networks, Brain Imaging and Behavior (2019) 13:1333-1351, Published online: Aug. 28, 2018 and including Electronic Supplementary Materials.*

(Continued)

*Primary Examiner* — Bo Joseph Peng
(74) *Attorney, Agent, or Firm* — Armstrong Teasdale LLP

(57) ABSTRACT

A biomarker predictive of a survival outcome of a brain tumor patient is disclosed. The biomarker includes a functional connectivity matrix that includes a plurality of matrix elements. Each matrix element includes a correlation of resting-state fMRI activities of a first and second region of interest from a plurality of regions of interest within the patient's brain. Computing device and systems are disclosed to transform a resting-state fMRI dataset obtained from the patient into the biomarker and to transform the biomarker into a predicted survival outcome using a machine learning model.

32 Claims, 27 Drawing Sheets

(51) Int. Cl.
*A61B 5/055* (2006.01)
*G01R 33/48* (2006.01)
*G06T 7/00* (2017.01)
*G16H 30/40* (2018.01)
*G16H 50/30* (2018.01)

(52) U.S. Cl.
CPC .......... *A61B 5/7246* (2013.01); *A61B 5/7264* (2013.01); *A61B 5/7275* (2013.01); *G01R 33/4806* (2013.01); *G06T 7/0012* (2013.01); *G16H 30/40* (2018.01); *G16H 50/30* (2018.01); *G06T 2207/10088* (2013.01); *G06T 2207/30016* (2013.01); *G06T 2207/30096* (2013.01)

(58) Field of Classification Search
CPC ... A61B 5/7246; A61B 5/7264; A61B 5/7275; G01R 33/4806; G06T 7/0012; G06T 2207/10088; G06T 2207/30016; G06T 2207/30096; G06N 3/045; G06N 3/08; G06N 20/10; G06V 2201/03
See application file for complete search history.

(56) References Cited

U.S. PATENT DOCUMENTS

| | | | |
|---|---|---|---|
| 2016/0192889 A1* | 7/2016 | Koutsouleris | G16H 50/70 600/410 |
| 2017/0228505 A1* | 8/2017 | Allen | G06N 5/04 |
| 2017/0344706 A1 | 11/2017 | Torres et al. | |
| 2019/0090749 A1* | 3/2019 | Leuthardt | G16H 30/40 |
| 2022/0183621 A1* | 6/2022 | Hawasli | A61B 5/055 |

OTHER PUBLICATIONS

Vergun, Svyat et al., Predicting primary outcomes of brain tumor patients with advanced neuroimaging MRI measures, Interdisciplinay Neurosurgery, vol. 13, Sep. 1, 2018, No. 109-118, pp. 1-25.

Liu, Luyan et al., Overall survival time prediction for high-grade glioma patients based on large-scale brain functional networks, Brain Imaging and Behavior, Springer US Boston, vol. 13, No. 5, Aug. 28, 2018 pp. 1333-1351.

Nie, Dong et al., 3D Deep Learning for Multi-modal Imaging-Guided Survival Time Prediction of Brain Tumor Patients, 2016, Arxiv Org pp. 212-220.

Extended European Search Report issued in EP Patent Application No. 20869057.8 dated Sep. 9, 2022, pp. 1-8.

Lu et al., "An Automated Method for Identifying an Independent Component Analysis-Based Language-Related Resting-State Network in Brain Tumor Subjects for Surgical Planning," Scientific Reports, 7: 13769 (2017). https://doi.org/10.1038/s41598-017-14248-5.

International Search Report and Written Opinion issued for PCT/US2020/052782, dated Dec. 31, 2020 (12 bages).

* cited by examiner

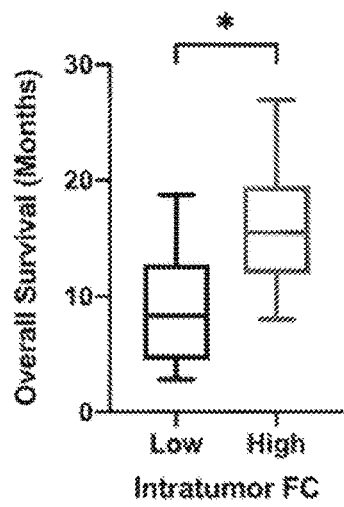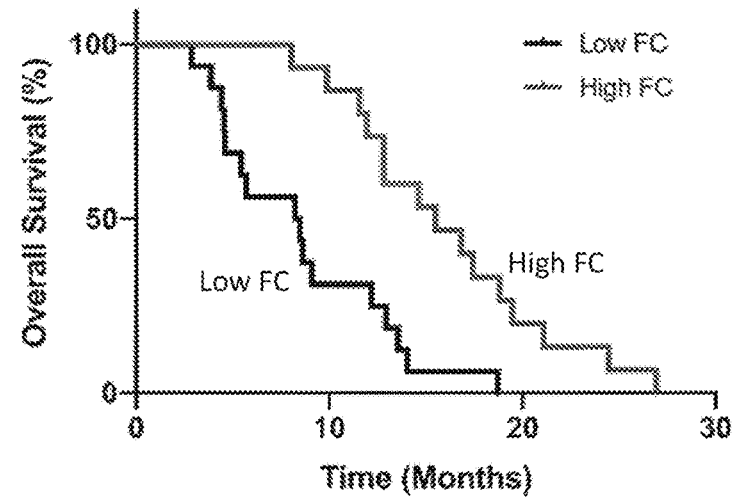
FIG. 4A　　　　　　　　　　FIG. 4B
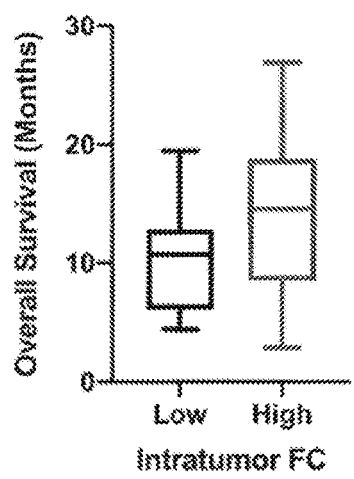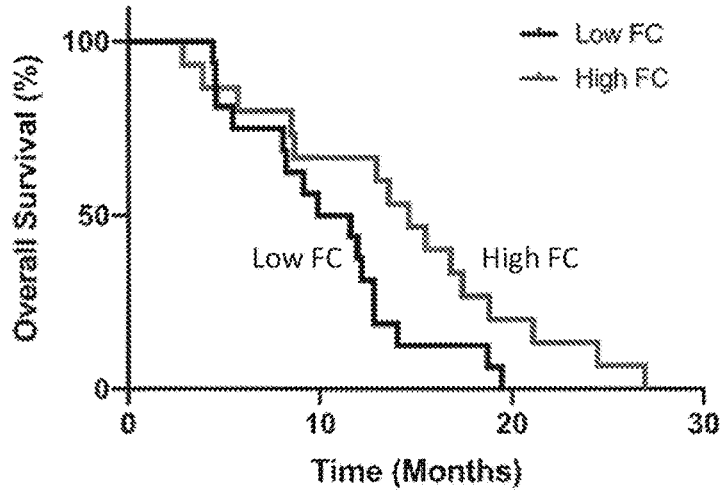
FIG. 4C　　　　　　　　　　FIG. 4D

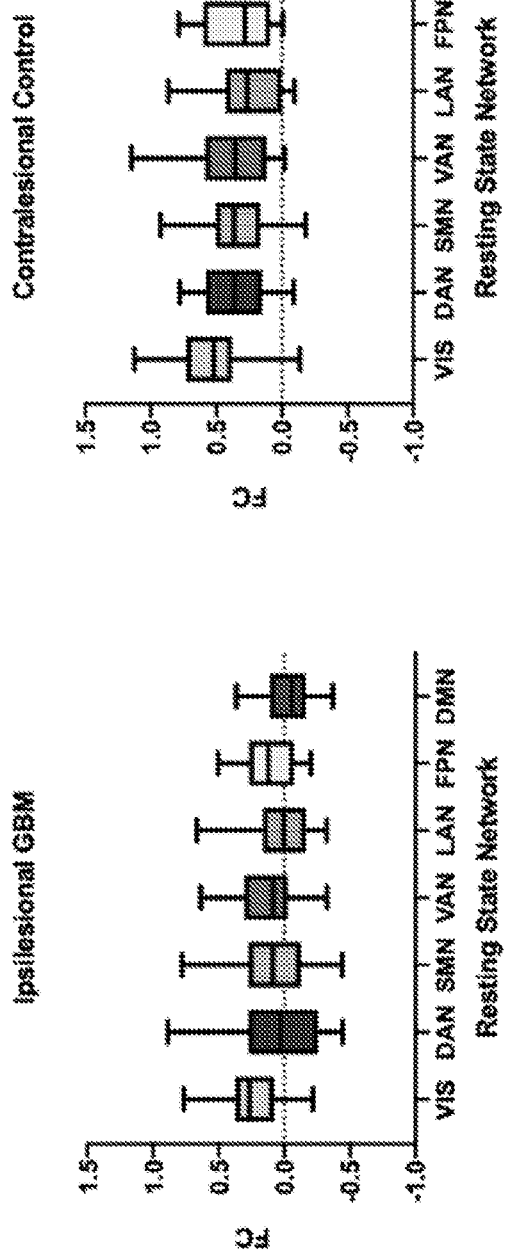
FIG. 14A
FIG. 14B
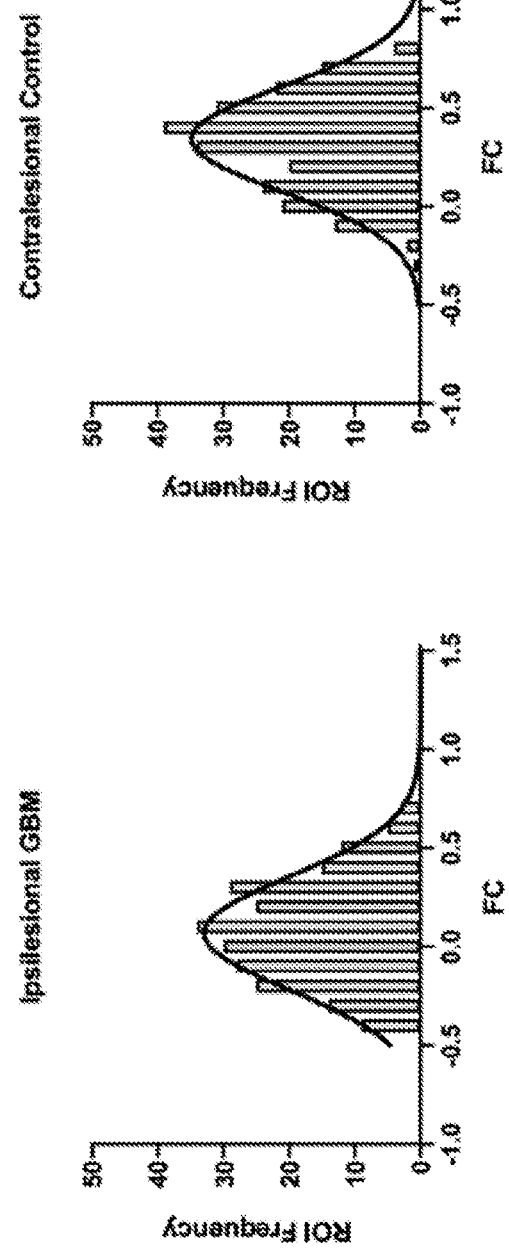
FIG. 14C
FIG. 14D

SYSTEMS AND METHODS FOR PRODUCING A BRAIN LESION FUNCTIONAL MRI BIOMARKER, PREDICTING PATIENT PROGNOSIS, AND TREATMENT PLANNING

CROSS-REFERENCE TO RELATED APPLICATIONS

This application is a US National Stage Entry of International Patent Application No. PCT/US2020/052782, filed Sep. 25, 2020, which claims the benefit of priority to U.S. Provisional Application Ser. No. 62/905,884 filed on Sep. 25, 2019, the entire contents of which are incorporated herein by reference in their entireties.

STATEMENT REGARDING FEDERALLY SPONSORED RESEARCH & DEVELOPMENT

This invention was made with government support under CA203861 awarded by the National Institutes of Health. The government has certain rights in the invention.

FIELD OF THE DISCLOSURE

The present disclosure generally relates to resting state function connectivity biomarkers, devices and systems to obtain the biomarkers, and methods of using the biomarker to predict a survival duration of a brain tumor patient.

BACKGROUND OF THE DISCLOSURE

What constitutes brain function is an evolving concept. As techniques to map or image functional sites in the brain advance, the role of a given anatomic location changes in concert with technical capability. Most notable in a neurosurgical setting is the concept of "eloquent cortex". These cortical regions are traditionally responsible for sensorimotor and language processing. Substantial effort is made to avoid eloquent cortex regions during surgical treatments because injury to these structures leads to overt neurological deficits with lasting impairment to the patient's quality and length of life. At present, cortical stimulation remains the gold-standard method of identifying these motor and speech areas during surgery. Often, the lack of stimulation-induced changes to motor movement or communication is interpreted as indicative of a cortical site of no functional consequence. This interpretation, however, neglects subtle cognitive processes such as attentional control, reasoning and planning, which are not easily assessed by standard clinical methods. These cognitive functions, however, are indeed relevant to patient outcomes and their under appreciation in pre-surgical planning may lead to a reduction in patient well-being and overall survival following treatment.

Glioblastoma is a highly infiltrative and deadly form of brain cancer. Given the heterogeneous nature of this disease, its course throughout the brain parenchyma is also extremely variable. For instance, there has been evidence of tumor growth resulting in death of surrounding tissue and local displacement of native cells, as well as the preservation of brain tissue within the tumor nidus maintaining functional responses. Limited studies have reported the presence of function within tumor boundaries and this has been relegated to only brain regions where overt functional changes can be identified intraoperatively, i.e. eloquent cortex. Such regions constitute sensorimotor and language areas with their detection typically probed via direct electrical stimulation. However, direct electrical stimulation measurements typically neglect subtle cognitive processes such as attention, executive function, reasoning and planning, which are not easily assessed in the operating room. Furthermore, these cognitive processes are relevant to patient outcomes and their underappreciation in pre-surgical planning may lead to a reduction in patient well-being and overall survival following treatment. While narrowly focused on eloquent cortex, past intratumoral function studies broadly investigated this phenomenon across tumor types. Moreover, these studies were limited by their sample size making population inferences about brain tumors in general and glioblastomas in particular extremely challenging. Due to the variability in proliferative and infiltrative patterns across tumor grades, it is also difficult to interpret the prevalence of intratumoral function and its effects on patient outcomes following surgical resection.

In the context of glioblastoma, a central question in their management is how much functional tissue is retained within the tumor. To date, this has been limited both by the definition of eloquence and the mapping methodologies used for functional identification. A limited number of studies have identified preserved functional tissue despite the classical view of tumors as displacing and/or destroying normal brain tissue. For examples, a subset of patients with tumors who had stimulation-identified functional tissue located within tumor boundaries were identified, and who experienced deficits when the tumors were resected. Magnetic source imaging has been performed on patients with cerebral lesions (primary tumors or otherwise), and approximately 24.5% possessed functional tissue within or at the lesion margins. Since previous research has been limited to classic eloquent cortex, the extent to which functionally viable tissue can be identified within tumors has not been thoroughly addressed.

To aid surgical planning for GBM treatment, functional magnetic resonance imaging (fMRI) is becoming routinely employed. In particular, resting-state fMRI (rs-fMRI) has been identified as a non-invasive brain mapping approach with several advantages over its predecessors. Resting state fMRI identifies temporally correlated blood-oxygen-level-dependent (BOLD) infra-slow intrinsic brain rhythms detected within a patient at rest, thereby enabling whole-brain identification of functionally connected networks. Resting state fMRI bypasses the eloquent cortex restrictions imposed by traditional mapping techniques. Further, motor and language networks have shown a good topographic correspondence to classically mapped eloquent regions with stimulation and task-based fMRI, thus supporting the functional relevance of other "non-eloquent" non-standardly mapped networks. Furthermore, motor and language networks have shown a good topographic correspondence to classically mapped eloquent regions with stimulation and task-based fMRI, thus supporting the functional relevance of other "non-eloquent" non-standardly mapped networks. Using rs-fMRI, several studies have identified network specific changes in the setting of GBMs and other brain tumors, compounding the evidence for the efficacy of this approach. However, many of these studies have also been plagued by small sample sizes with conclusions made using heterogeneous tumor pathologies. Also to date, the prevalence and effects of GBM intratumoral function using rs-fMRI has not been addressed although this imaging methodology permits the identification of function including and beyond eloquent areas.

BRIEF DESCRIPTION OF THE DISCLOSURE

In one aspect, a biomarker predictive of a survival outcome of a brain tumor patient is disclosed. The biomarker includes a functional connectivity matrix that includes a plurality of matrix elements. Each matrix element includes a correlation of resting-state fMRI activities of a first and second region of interest from a plurality of regions of interest within the patient's brain.

In another aspect, a computing device configured to transform a resting-state fMRI dataset of a brain tumor patient into a predicted survival outcome is disclosed. The computing device includes at least one processor and a non-volatile computer-readable media. The non-volatile computer-readable media includes instructions executable on the at least one processor to transform the resting-state fMRI dataset into a functional connectivity matrix that includes a plurality of matrix elements. Each matrix element includes a correlation of resting-state fMRI activities of a first and second region of interest from a plurality of regions of interest within the patient's brain. The non-volatile computer-readable media further includes instructions executable on the at least one processor to transform the functional connectivity matrix into the predicted survival outcome using a machine learning model.

In an additional aspect, a system for predicting a survival outcome of a brain tumor patient is disclosed. The system includes a computing device configured to transform a resting-state fMRI dataset of a brain tumor patient into a predicted survival outcome is disclosed. The computing device includes at least one processor and a non-volatile computer-readable media. The non-volatile computer-readable media includes instructions executable on the at least one processor to transform the resting-state fMRI dataset into a functional connectivity matrix that includes a plurality of matrix elements. Each matrix element includes a correlation of resting-state fMRI activities of a first and second region of interest from a plurality of regions of interest within the patient's brain. The non-volatile computer-readable media further includes instructions executable on the at least one processor to transform the functional connectivity matrix into the predicted survival outcome using a machine learning model.

In another additional aspect, a computer-implemented method of predicting a survival outcome of a brain tumor patient is disclosed. The method includes receiving, at a computing device, a resting-state fMRI dataset of the glioblastoma multiforme patient, transforming, using the computing device, the resting-state fMRI dataset into a functional connectivity matrix comprising a plurality of matrix elements. Each matrix element includes a correlation of resting-state fMRI activities of a first and second region of interest from a plurality of regions of interest within the patient's brain. The method further includes transforming, using the computing device, the functional connectivity matrix into the predicted survival outcome using a machine learning model.

Other objects and features of the disclosure will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 4A is a graph summarizing the overall survival in GBM patients with low intratumor functional connectivity (FC) as compared to patients with high intratumor FC; FC was derived using regions of interest containing tumors. Asterisk indicates significant difference (right-tailed Wilcoxon rank sum, W=240, p<0.001, Bonferroni corrected).

FIG. 4B is a graph summarizing a Kaplan Meier survival analysis comparing overall survival in low intratumor FC GBM patients (solid black line) and high FC patients (dashed red line); FC was derived using regions of interest containing tumors. Patients with high intratumoral FC had a significantly longer overall survival than those with low intratumoral FC (HR: 0.25, 95% CI: 0.11-0.58, P=0.0011).

FIG. 4C is a graph summarizing the overall survival in GBM patients with low intratumor functional connectivity (FC) as compared to patients with high intratumor FC; FC was evaluated voxel-wise (right-tailed Wilcoxon rank sum, W=281, p=0.11, Bonferroni corrected).

FIG. 4D is a graph summarizing a Kaplan Meier survival analysis comparing overall survival in low intratumor FC GBM patients (solid black line) and high FC patients (dashed red line); FC was evaluated voxel-wise. Patients with high intratumoral FC had a significantly longer overall survival than those with low intratumoral FC (HR: 0.45, 95% CI: 0.21-0.98, p=0.044).

FIG. 14A is a graph summarizing the Fisher z transformed intratumor ROI network connectivity for ipsilesional tumor ROIs of GBM patients. The intra-network connectivity strength of each ROI found within a patient's tumor was used to generate the boxplot corresponding to that ROI's assigned network.

FIG. 14B is a graph summarizing the Fisher z transformed intratumor ROI network connectivity for contralesional control ROIs of GBM patients.

FIG. 14C is a histogram showing the intra-network connectivity distribution for ROIs found within ipsilateral tumor regions of each GBM patient.

FIG. 14D is a histogram showing the connectivity strengths and overall intra-network distributions for the contralateral control ROIs of each GBM patient.

Figure 1A:
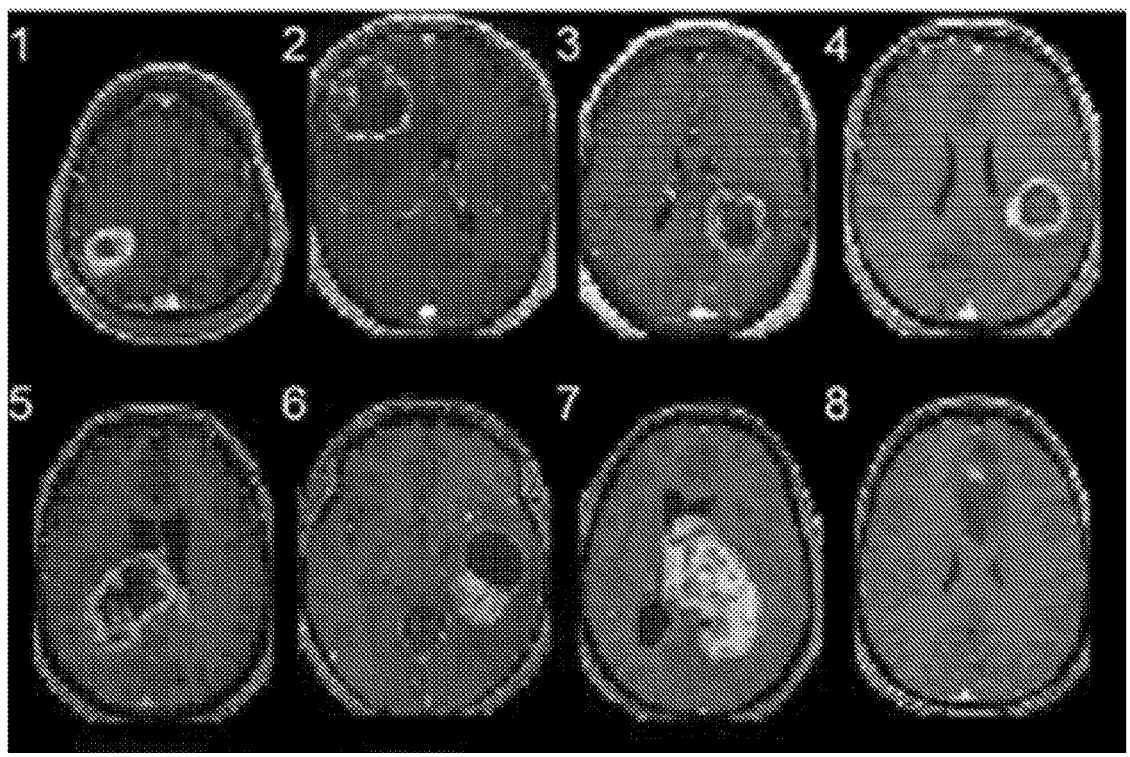
FIG. 1A contains a series of T1-weighted contrast-enhanced image slices (T1+Contrast) containing GBM lesions obtained from 8 patients (labelled 1-8, respectively).

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE DISCLOSURE

In various aspects, systems and methods to generate a functional MRI biomarker for a brain lesion and to predict patient outcome and/or plan a treatment for a brain lesion using an analysis of the functional MRI biomarker are provided herein.

I. Functional MRI Biomarker

The persistence of functional tissue within high-grade gliomas was first reported approximately two decades ago. The presence or absence of "eloquent" tissue, however, has been limited both by the methods used and by the definition of function (e.g. stimulation positive motor and language sites). The advent of resting state fMRI and the emerging notion of functional networks has expanded the notion of a given brain region's role in a cognitive operation. This is echoed by the expanding clinical notion of what is defined as eloquent and their role in clinical and cognitive outcomes. Resting-state fMRI has been applied to brain mapping of a broad spectrum of functional processes in patients with brain tumors. Rather than mapping function adjacent to tumors, in various aspects the prevalence of functional tissue within the glioblastoma itself may be determined using rs-FMRI. Making use of rs-FMRI, the ability to identify whole-brain networks is not limited to brain regions that require an overt task or cortical stimulation response. As described below, virtually all glioblastomas typically retain functional tissue within the tumor (98.3%; n=56). Without being limited to any particular theory, the retention of these functional regions within the tumor is thought to have an adverse impact on the patient's survival, most notably the language network (LAN). Thus, in addition to resting state fMRI networks playing a role in brain mapping, the identification of these networks within a glioblastoma also provides an important radiological prognostic biomarker.

As disclosed below, there exists a wide variability in the type of function identified in each tumor. As measured using rs-fMRI, each glioblastoma patient typically has voxels belonging to at least one resting-state network within their tumor. This is expected since resting-state networks are spatially dependent and the tumor locations are heterogeneous.

Figure 11:
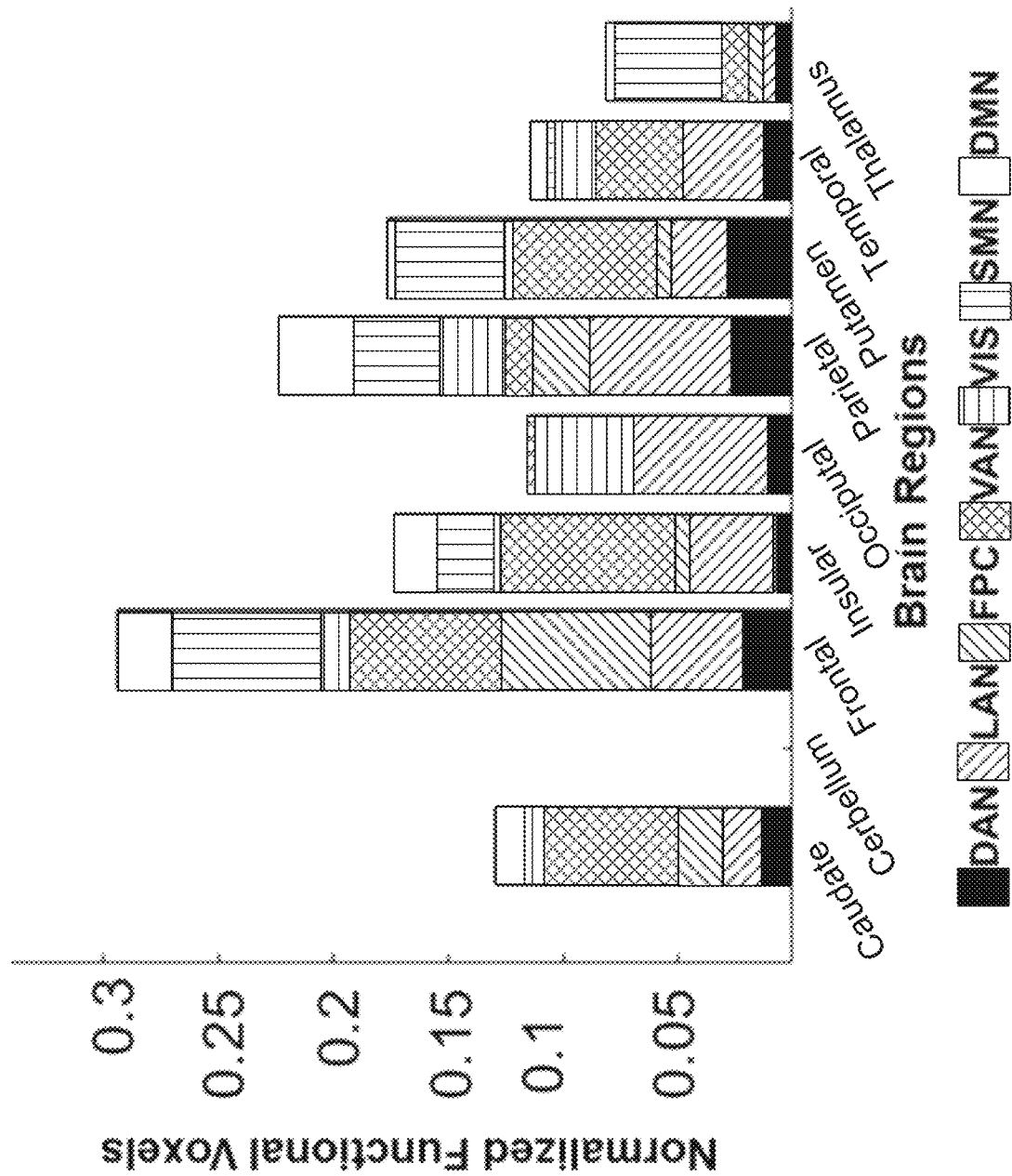
FIG. 11 is a stacked-bar graph summarizing the mean amount of functional tissue belonging to each RSN normalized by the tumor volume found within the corresponding segmented gray matter regions. Lines indicate significant differences of p<0.05. GBMs in the frontal lobe have the greatest proportion of functional tissue relative to tumor size compared to all other locations (with the exception of parietal; 0.29 vs 0.22, p=0.18) while the thalamus has the lowest. No GBM tumors were found in the cerebellum. Legend=LAN: Language network; SMN: somatomotor network; VIS: vision network; DAN: dorsal attention network; VAN: ventral attention network; FPC: fronto-parietal network; DMN: default mode network.

Also disclosed below, there exists a functional distribution of voxels in the FLAIR hyperintense areas outside of the contrast-enhanced margins of a glioblastoma tumor region. The number of functional voxels is greater in the FLAIR regions than the contrast-enhanced and non-enhanced volumes (p<0.01). As demonstrated below, when normalizing for region sizes, however, only the DAN, SMN and LAN resting state networks retained a significantly higher number of functional voxels within the FLAIR regions. Interestingly, the DAN, SMN and LAN networks fall into a main category of networks called the extrinsic network system, with SMN and LAN constituting traditional eloquent cortex. Without being limited to any particular theory, the difference in distribution of functional voxels in FLAIR and contrast-enhanced regions may be due to the cytoarchitecture of the brain parenchyma at those locations, and these tissues may be more susceptible to destruction than other brain areas (see FIG. 11).

Without being limited to any particular theory, the network variability within tumors also appears to play a role in the patients' survival. Typically, resection of preserved functional tissue within the eloquent cortex has resulted in short and long-term motor and speech deficits. In addition, patients who have worse functional outcomes following surgery have been associated with a reduced overall survival. With the exception of dorsal attention networks, all networks showed a general trend of increased overall survival if no corresponding functional voxels were found within the tumor margins, but only the retention of language networks demonstrated a statistically significant correlation with decreased survival. Kaplan-Meier survival analyses, described below, revealed an approximately 10-month difference in median survival due to retention of language networks (18.78 for the no intra-function group vs 8.64 for the intra-function group). Without being limited to any particular theory, the presence of retained functional connectivity in tumors is thought to be predictive of overall survival because the presence of functional intratumoral tissue, if resected, could lead to unforeseen deficits, thus affecting long-term clinical outcomes. Alternatively, given previous findings that brain tumor cells form interconnected functional networks, the retained presence of functional networks in the tumor may provide a functional architecture co-opted by the glioblastoma to enable more aggressive growth and expansion.

As disclosed below, functionally connected brain tissue is often preserved within glioblastomas. Further, the presence of these preserved networks within the tumor, language networks especially, have negative prognostic implications for the patient. In various aspects, resting state fMRI performed on a glioblastoma patient may be used for both brain mapping and to determine a radiological prognostic biomarker based on intratumoral functional connectivity. In various other aspects, this radiological prognostic biomarker may inform the planning of a treatment for the glioblastoma patient. By way of non-limiting example, longer-term or aggressive treatments, such as radiation treatment or chemotherapy, may not be indicated for a patient identified as having a negatively impacted survival outcome based on the radiological prognostic biomarker.

By way of another non-limiting example, the radiological prognostic biomarker for an individual patient may enable the selection for a suitable treatment plan. In this example, patient response to different therapies may be associated with different aspects of the radiological prognostic biomarker including, but not limited to, strength of intratumoral functional connectivity, number and/or type of resting-state functional networks associated with the functional intratumoral voxels, and any other suitable aspect of the radiological prognostic biomarker without limitation.

By way of yet another non-limiting example, the radiological prognostic biomarker for an individual patient may enable surgical planning if a resection of the tumor is indicated. In this example, the spatial distribution of the radiological prognostic biomarker (intratumoral functional connectivity) within the tumor may be used to identify tumor tissue to be resectioned versus tumor tissue to be retained to enhance patient outcome. Further, the rs-fMRI data, in particular the global resting-state functional network map, may be used in the surgical planning associated with a resection treatment to enhance patient outcome.

Glioblastoma (GBM) assumes a variable appearance on magnetic resonance images owing to heterogeneous proliferation and infiltration of its cells. As a result, the neurovascular units (NVUs) responsible for brain network communication (i.e. functional connectivity (FC)) may still exist within gross tumor, albeit with altered activity. Furthermore, the variability of this activity may indicate that tumor invasion may be characterized less as disturbed connectivity within tumor boundaries and may rather suggest greater preservation of NVUs within tumor boundaries in at least some cases. As described in detail below, resting-state fMRI in 57 de novo GBM patients are used to characterize the relationship between local within-tumor FC and survival outcomes. Functionally connected voxels, not identifiable on conventional structural images, are routinely found within the tumor mass. Investigation of FC-assigned tumor voxels via spectral analysis revealed signal properties similar to both gray matter and vasculature derived signals. As highlighted by the analysis of pre-defined intratumoral FC regions of interest (ROIs), higher intra-network connectivity strengths within GBMs are associated with better overall survival. These findings suggest the possibility that functionally communicating regions may persist within GBM and that the extent to which FC is maintained may be prognostic and informative for treatment planning.

In various aspects, described below, the presence of intratumoral function in 57 de novo GBM patients is evaluated using functional connectivity network assignments derived from rs-fMRI. Networks within tumors are assigned using a pre-trained and previously reported classifier. As described below, traditional seed-based functional connectivity analyses are also performed to provide supportive evidence for network detection. Functionally connected tissue associated with both classical notions of eloquent function as well as the intrinsic cognitive networks are also identified. Furthermore, in a subset of patients, the degree of intratumoral function is demonstrated to be associated with overall patient survival. Taken together, functionally connected networks are routinely observed within GBM, and the presence and strength of these networks have potential prognostic value.

The possibility of functional brain tissue within GBMs has been suggested previously, but previous studies have been limited by functional scope (i.e. a focus on eloquent cortex) as well as study parameters (i.e. low sample size and tumor pathology conflation). Both limitations may underestimate the prevalence of intratumoral function in GBM, thereby potentially restricting its clinical significance and reported influence on patient outcomes. To overcome these concerns, rs-fMRT was used in 57 newly diagnosed GBM patients to non-invasively identify functional connectivity (FC) within contrast-enhanced tumor boundaries. While direct electrical stimulation identifies brain function by associating overt responses to stimulated cortical sites observed intraoperatively, FC utilizes the statistical synchronization of neurovascular dependent signals to infer network concordance of spatially remote regions during pre-surgical planning. As a result, brain networks responsible for cognitive processes can also be isolated and the network distribution across the entire brain can be disambiguated. This approach permits a greater characterization of intratumoral function in GBMs and allowed for preliminary investigations into its role in patient outcomes, specifically overall survival.

To date, intratumoral function has not been thoroughly characterized using resting-state FC. The identification of intratumoral function using the pre-trained MLP algorithm was qualitatively demonstrated previously, but no attempts were made to quantify its prevalence, connectivity strength or potential role in patient outcomes. To qualitatively identify brain function, a multilayer perceptron was used. The multilayer perceptron was pre-trained with its assignments validated on over 600 healthy subjects. In training, the whole brain connectivity map of individual voxels was used to assign concordance to either noise or to one resting state network selected from seven potential resting state networks, enabling all voxels to be subsequently assigned. Despite being trained on healthy subjects, the assignments generated using the multilayer perceptron have also shown good correspondence to expected function in epilepsy and brain tumor subjects. Additionally in the analysis described below, only winner-takes-all assignments exceeding 0.95 were kept to denote function within and outside of tumors. Although the efficacy of any machine learning algorithm, including the multilayer perceptron, is vulnerable to producing false positives due to inherent individual and network variability, the network estimations obtained using the multilayer perceptron are in agreement with network assignments obtained using other techniques including cortical stimulation mapping and task-based fMRI.

Since functional connectivity requires statistical associations of distinct brain regions to confer network assignments, 169 a priori ROIs were selected for use, each ROI belonging to one of seven highly studied networks to serve as sources for functional comparisons. These ROIs were also initially used in generating the training set for the MLP algorithm. This allowed us to limit our assumptions in determining what function typically exists at brain regions generally as well as at the locations where the GBMs now occupied. Furthermore, by using the ROIs outside of contrast-enhanced tumor and FLAIR hyperintense peritumoral edematous regions to calculate the representative network signals, the involvement and contribution of brain pathology was limited to the intratumoral rs-fMRI signals. Although the presence of GBM cells beyond the gross tumor and edema regions has been identified previously, the role of these distal cells in altering brain networks has not been inferred. Despite using these previously studied ROIs, the inherent variability of network connectivity in healthy subjects prohibited strict intratumoral connectivity assignments without first accounting for this variability.

Expected connectivity strengths of the ROIs in healthy subjects were produced by performing a similar functional connectivity analysis within regions within the healthy subjects corresponding to the intratumoral regions identified in the GBM patient population. This approach allowed for the observation that collectively GBM patients had lower functional connectivity within tumors than would be expected in healthy brain tissue similarly positioned. However, the majority of GBM patients retained connectivity greater than the significance level of controls (83% had at least 1 ROI greater than this level) while some GBM patients still had intratumoral regions that were highly connected to healthy brain (see FIGS. 2C, 2D, and 2E). Without being limited to any particular theory, the microenvironment of each patient's tumor, as characterized by the extent to which functional tissue is preserved and the properties of the tumor cells, may influence the degree of variation in preserved function.

In some aspects, the selection of a priori ROIs limited the scope of assumptions made in assigning function within tumors. However, given that the ROIs are fixed in location and volume across patients and that GBMs were heterogeneous throughout the cortex, a few patients (n=4) in the study described below did not contain ROIs within their tumors and had to be excluded from the ROI intra-network connectivity analyses. Furthermore, tumor growth can result in the remapping of function to adjacent areas such that the ROI approach may limit the extent of functional connectivity that could be detected within tumors. However, given the inherent variability in functional connectivity strength across the brain and across patients the criteria for functional connectivity assignments within tumors was selected to be conservative. For this reason, the resting-state network signals previously derived from the ROIs in healthy brain regions were correlated to all voxels found within each tumor, resulting in 7 connectivity measures for each voxel. A conservative threshold of 0.3 was chosen to denote a FC assignment of any voxel to a network as it surpasses the Bonferroni correction for the number of voxels used in our brain mask (n=65,549 voxels). Moreover, prior studies investigating network connectivity using graph theoretical approaches have used a similar threshold to denote network assignments. Despite this high threshold, 98.3% of patients in the study described below had voxels with assigned FC within their GBM volumes (see FIG. 3D), indicating that intratumoral function is a common characteristic. Additionally, the study described below determined that the percentage of FC-assigned intratumoral voxels was independent of tumor volume (see FIG. 3D), suggesting that the heterogeneity of GBMs leads to a heterogeneity of preserved function.

Methods of predicting GBM patient outcomes are highly desired given the dismal prognosis of GBM, and many groups are working to determine quantitative structural imaging features that are predictive of genetic markers associated with patient outcomes or could directly predict outcomes such as progression-free survival and overall survival. In various aspects, resting-state functional connectivity imaging provides prognostic information for neurosurgeons, neuro-oncologists, GBM patients and caretakers. In various aspects, this prognostic information may be used to select a treatment plan. By restricting survival investigations in the study described below to patients with intratumor ROIs, the number of patients assessed was limited (up to 93% of patients) but bias in functional assignments was also limited. The use of a priori ROIs could also serve as a template for comparisons with future rs-fMRI GBM datasets. Furthermore, stratifying patients into high and low FC subgroups using a median split limited the effects of sample size differences on subsequent statistical comparisons. Intratumoral functional connectivity strength is predictive of overall survival in GBM patients even after controlling for clinical and genetic covariates. Without being limited to any particular theory, this may be due to the intratumor connectivity measures serving as a proxy for tumor cell aggressiveness within the gross mass. It could be expected that a highly aggressive GBM cell population would be more destructive of native brain compared to a less aggressive glioma. This could result in loss of neurons and neurovascular coupling that is essential for functional connectivity of remote brain areas. Therefore, GBM patients with higher intratumor connectivity could have less aggressive gliomas than GBM patients with lower intratumor connectivity resulting in longer survival times for the former. Thus, measures of intratumor connectivity may distinguish patients during the treatment planning phase, enabling neurosurgeons to be more informed prior to surgery. Measures of intratumor connectivity may also help in selecting and stratifying patients for clinical trials.

The methodology required to obtain functional connectivity networks differs from function acquired through direct electrical stimulation as the former involves magnetic susceptibility changes of hemodynamic signals due to neuronal activation. Therefore both neural and vascular elements can alter the fMRI signals. As a result, the functional assignments obtained as described herein may be influenced by vascular effects such as shared venous drainage. The power spectra found within tumors as described below were significantly different than MLP-assigned voxels outside of tumor and peritumoral regions at various frequency bins, suggesting that the BOLD-response mechanisms within a tumor may differ from normal brain tissues (see FIG. 5A). Additionally, the full-width half max of the autocorrelation of MLP-assigned brain voxels is not significantly different from MLP-assigned tumor voxels but is different from unassigned tumor voxels. However, assigned tumor voxels are not significantly different from unassigned voxels (see FIG. 5B). Since gray matter tissue has been shown to have greater autocorrelation than white matter or vasculature, functionally assigned tumor voxels may possess both gray-matter and vascular properties. Despite the ambiguity in signal origin, the findings of the study described below demonstrated clinically relevant results.

Functionally assigned voxels were observed in both the contrast-enhancing regions of glioblastoma as well as the hypointense, non-contrast enhancing regions commonly attributed to "necrosis". Without being limited to any particular theory, it is typically thought that functional connectivity is not possible within an area that is truly necrotic and non-viable. However, high cellularity has been observed within regions characterized as necrotic via MRI and cannot be reliably distinguished from contrast-enhanced cells. Therefore, histological evidence supports the observation of functional connectivity within the hypointense, non-contrast enhancing regions commonly attributed to "necrosis". It should also be noted that unlike strictly destructive brain lesions, such as stroke or traumatic brain injuries, glioblastoma is a living, dynamic network of cells. As a result, the strict consideration of tumor-induced changes within the brain may limit understanding of the tumor's effects, and instead changes occurring within tumor masses may also provide integral information.

Given that MRI is widely used for the identification of glioblastoma during pre-surgical planning and that the pulse sequences required for resting-state fMRI are typically available on standard MRI machines, intratumoral functional connectivity could easily be added to existing pre-treatment planning protocols. The use of automated or semi-automated segmentation applications could facilitate the segmentation of tumors and edema making the pre-treatment planning process less labor intensive than manual methods. This segmentation would be essential for separating healthy brain ROIs from pathologic ROIs. Additionally, several functional connectivity ROI datasets currently exist that cover more brain regions than the 169 ROI dataset used in the study described below. An expanded number of ROIs may render the method described herein compatible with a wider patient population.

Functionally connected brain tissue, as defined by resting state fMRI, is present in the substantial majority of glioblastomas. Further, the strength of these networks within the tumor has prognostic implications for the patient. These findings highlight the important role of resting state fMRI both in brain mapping and as a potential radiological prognostic biomarker.

A. Biomarkers Based on Intratumoral Resting-State Functional Connectivity

In various aspects, a biomarker predictive of a survival outcome of a brain tumor patient includes a strength of intratumor functional connectivity. Using a computing device described below, resting—state functional MRI (rs-fMRI) data is obtained from the patient's brain according to any suitable imaging sequence known in the art without limitation. Non-limiting examples of suitable imaging sequences include a T2* echo planar imaging sequence, any gradient-echo echo planar imaging sequence sensitive to BOLD contrast, or any other suitable imaging sequence. Other non-limiting examples of imaging sequences suitable for obtaining resting-state functional MRI data are described in the Examples below.

In addition to the rs-fMRT data, structural MRI data is obtained and segmented according to any suitable protocol without limitation. The segmented structural MRI data is used to determine the location of at least one tumor within the brain of the patient.

In various aspects, the functional connectivity of voxels identified as tumor voxels from the structural MRI data is determined. To determine functional connectivity, the rs-fMRI activity of the tumor voxels is correlated with the corresponding resting-state fMRI activity of non-tumor voxels associated with at least one resting-state network (RSN). As illustrated in FIG. 1D, time series of rs-fMRI measurements associated with tumor voxels are compared to time series of rs-fMRI measurements associated with at least one resting state network to produce the correlation. Any known method of correlation of time-series data may be used to produce the correlations described above without limitation. Non-limiting examples of suitable correlation methods include Pearson's correlation method.

In various aspects, the corresponding rs-fMRI activity of voxels associated with the at least one RSN is determined by analysis of the rs-fMRI data from the patient's brain. In some aspects, the rs-fMRI data are analyzed within pre-selected ROIs known to be associated with the RSNs. In these aspects, the ROIs may be selected based on previous analysis of rs-fMRI data from population of subjects, from previously-published literature, and any combination thereof. In other aspects, the corresponding rs-fMRI activity of voxels associated with the at least one RSN is determined by de novo analysis of the rs-fMRI data from the patient using any known suitable method including, but not limited to, seed-based methods and methods using supervised classifier machine learning method such as a multi-layer perceptron (see FIG. 1C). Non-limiting examples of the use of the analysis methods described above are described in additional detail in the Examples below.

In various aspects, the functional connectivity of the tumor voxels is determined by transforming the correlations of resting-state fMRI activity of tumor voxels with respect to the corresponding activity of the at least one RSN into a correlation strength. In at least some aspect, the correlation strength corresponds to any parameter indicative of the statistical significance of the correlation. Any known method of assessing the significance of a correlation may be used to determine the functional connectivity. By way of non-limiting example, a Fisher's z transform is used to transform a correlation of the rs-MRI activity of the tumor voxels with respect to the corresponding RSN activity into a correlation strength representative of a functional connectivity (FC). In some aspects, the tumor voxels are assigned to a RSN if the strength of the correlation is greater than a threshold strength. By way of non-limiting example, the tumor voxels are assigned to a RSN if a Fisher's z transform of a Pearson correlation r is greater than a threshold value. In one aspects, the threshold value is at least 0.3. In other aspects, the threshold values is at least 0.3, at least 0.4, at least 0.5, at least 0.6, at least 0.7, at least 0.8, at least 0.9, at least 0.95, or higher.

In various aspects, FC determined from the plurality of tumor voxels may be further analyzed to calculate a summary parameter representative of intratumor FC to be used as the biomarker. In one aspect, a percentage of tumor voxels assigned to any one of more FCs is calculated as the biomarker. In another aspect, the median FC of the tumor voxels is calculated and used as the biomarker.

In various aspects, the biomarker is predictive of the survival outcome of a brain tumor patient. In one aspect, the biomarker is used to classify the brain tumor patient as a short-term survivor or a long-term survivor. In this aspect, the biomarker is compared to a threshold value to classify the patient. Brian tumor patients with biomarker values less than a threshold value are classified as short-term survivors, and patients with biomarker values of at least the threshold value are classified as long-term survivors. In various aspects, the threshold value is determined by a statistical analysis of the biomarkers calculated as described above and the known survival durations of a population of brain tumor patients. A non-limiting example of such an analysis is described in additional detail in the Examples below.

In some aspects, the correlation of the rs-fMRT activity of tumor voxels to corresponding resting-state fMRI activity of non-tumor voxels associated with at least one resting-state network is performed on a voxel-wise basis as described above. In other aspects, this correlation is performed on a region-of-interest basis. In these other aspects, mean rs-fMRI time series are determined for each ROI of a plurality of ROIs throughout the brain of the patient. The mean rs-fMRI time series of those ROIs containing voxels that overlap the brain tumor voxels are analyzed as described above to determine FC and the biomarker.

In various aspects, the resting-state fMRI activity of tumor voxels is correlated with the corresponding resting-state fMRI activity of non-tumor voxels associated with at least one resting-state network (RSN). The at least one RSN may include any one or more known RSNs including, but not limited to, cingulo-opercular network (CON), frontoparietal network (FPN), dorsal attention network (DAN), ventral attention network (VAN), salience (SAL) network, somatomotor dorsal (SMD) network, somatomotor lateral (SML) network, visual (VIS) network, auditory (AUD) network, Medial Temporal Lobe (MTL) network, Reward (REW) network, parietomedial (PMe) network, default-mode (DMN), and any combination thereof. The use of various subsets of the RSNs in the analysis described above are described in additional detail in the Examples below.

B. Biomarkers Based on Whole-Brain Resting-State Functional Connectivity

In various aspects, a biomarker predictive of a survival outcome of a brain tumor patient includes a functional connectivity matrix with a plurality of matrix elements, in which each matrix element includes a correlation of a first and second region of interest from a plurality of regions of interest within the patient's brain. Without being limited to any particular theory, it is thought that the presence of a brain tumor alters patterns of functional connectivity of both tumor voxels and non-tumor voxels; these patterns capture information predictive of the survival outcome of a brain tumor. These patterns are robust, and predict survival outcome even in the presence of different tumor locations, heterogeneous tumor characteristics, and varying patient demographics, as demonstrated in the Examples below.

In various aspects, each matrix element corresponds to a correlation of resting-state fMRI activities between pairs of regions of interest (ROIs). The rs-fMRI activities are determined using fMRI data obtained from the patient's brain according to any suitable imaging sequence known in the art without limitation. Non-limiting examples of suitable imaging sequences include a T2* echo planar imaging sequence, any gradient-echo echo planar imaging sequence sensitive to BOLD contrast, or any other suitable imaging sequence. Other non-limiting examples of imaging sequences suitable for obtaining resting—state functional MRI data are described in the Examples below. For each matrix element, a mean time series of fMRI signals are calculated over the voxels of a first ROI and correlated with the mean time series of fMRI signals are calculated over the voxels of a second ROI.

In some aspects, the ROIs are pre-selected prior to further analysis. In some aspects, the ROIs may be selected based on previous analysis of rs-fMRI data from population of subjects, from previously published literature, and any combination thereof. In some aspect, at least a portion of the ROIs is selected based on a known association with one of the RSNs described above. In other aspects, at least a portion of the ROIs are selected based on a known anatomical location within the brain including, but not limited to, cerebrum, cerebellum, brain stem, lobes of the cerebrum including frontal lobe, parietal lobe, occipital lobe, and temporal lobe, regions of the frontal lobe such as Broca area and motor strip, regions of the parietal lobe such as sensory strip, and regions of the temporal lobe such as Wernicke's area.

Any suitable number of ROIs are used to produce the functional connectivity matrix without limitation. Without being limited to any particular theory, the number of ROIs may be suitably high to provide sufficient differentiation of survival outcomes, but not so high as to induce confounding factors such as data overfitting or excessive computing time. In various aspects, the number of ROIs is at least 25, at least 50, at least 60, at least 75, at least 100, at least 200, at least 300, at least 400, at least 500, at least 750, or more.

In various aspects, the matrix elements are determined by correlating the mean time series of rs-fMRI activity of each pair of ROIs from the plurality of ROIs. Any known method of correlation of time-series data may be used to produce the correlations described above without limitation. Non-limiting examples of suitable correlation methods include Pearson's correlation method.

In various other aspects, the correlations of rs-fMRT series of ROI pairs are transformed into correlation strengths corresponding to any parameter indicative of the statistical significance of the correlation. Any known method of assessing the significance of a correlation may be used to determine the functional connectivity including, but not limited to, a Fisher's z transform.

Figure 16:
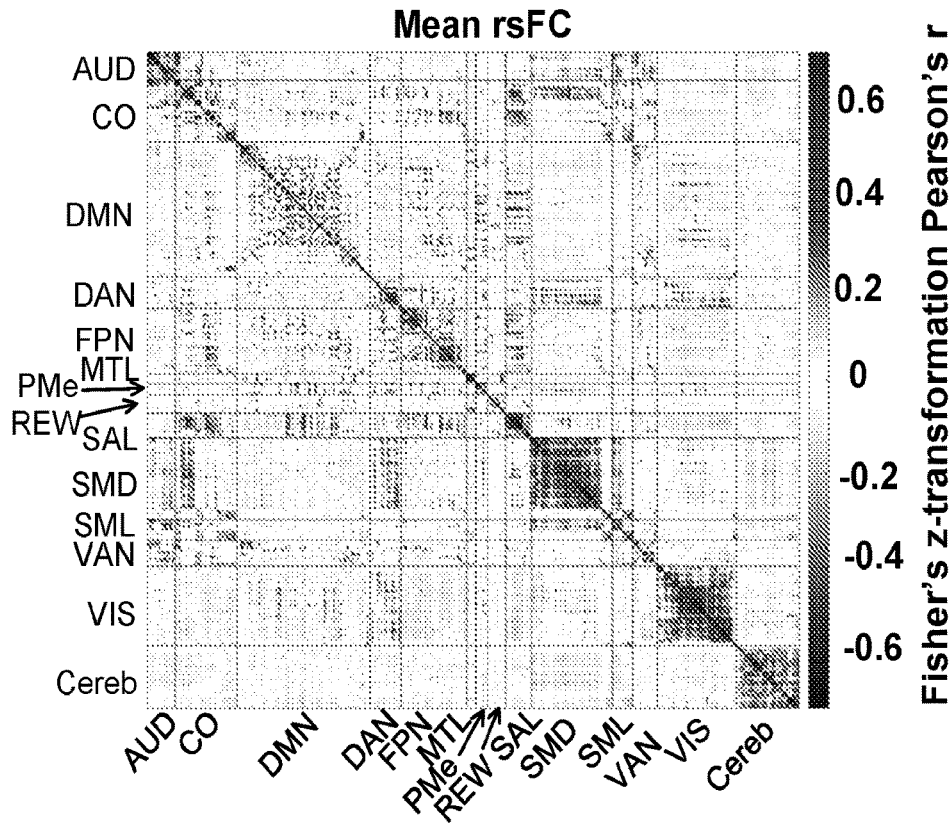
FIG. 16 is a mean resting state functional connectivity (rsFC) matrix summarizing the mean rsFC between 288 regions of interest (ROIs) in a population of glioblastoma multiforme (GBM) patients; rsFC is expressed as Fisher's z-transformed Pearson's r and ROIs are grouped by location in cerebellum (Cereb) and by assignment to resting state networks cingulo-opercular network (CON), frontoparietal network (FPN), dorsal attention network (DAN), ventral attention network (VAN), salience (SAL) network, somatomotor dorsal (SMD) network, somatomotor lateral (SML) network, visual (VIS) network, auditory (AUD) network, Medial Temporal Lobe (MTL) network, Reward (REW) network, parietomedial (PMe) network, default-mode (DMN).

In some aspects, each element of the functional connectivity matrix comprises a correlation of rs-fMRI activity between two ROIs. In other aspects, each element of the functional connectivity matrix comprises a correlation strength of rs-fMRI activity between two ROIs. By way of non-limiting example, each element of the functional connectivity matrix comprises a Pearson's correlation r of rs-fMRT activity between two ROIs. By way of another non-limiting example, each element of the functional connectivity matrix comprises Fisher's z transform of a Pearson's correlation r of rs-fMRI activity between two ROIs, as illustrated in FIG. 16.

In various aspects, the biomarker comprising the functional connectivity matrix is transformed into a survival outcome using a machine learning model. Without being limited to any particular theory, the machine learning model is trained to associate various features, corresponding to matrix elements, of the functional connectivity matrix with various survival outcomes. In some aspects, the machine learning model classifies a patient as a short-term survivor or a long-term survivor based on at least one feature of the functional connectivity matrix. In this classification, a short-term survivor indicates a predicted survival of less than a threshold survival term and a long-term survivor indicates a predicted survival of greater than the threshold survival term. In various aspects, the threshold survival term corresponds to a clinically meaningful duration. In one aspect, the threshold survival term is used to select a treatment protocol for a patient. By way of non-limiting example, a first type of treatment, such as a palliative treatment, may be recommended for a patient classified as a short-term survivor, whereas a second type of treatment, such as resection, chemotherapy, and/or radiotherapy may be recommended for a patient classified as a long-term survivor.

In various aspects, the threshold survival term is 1 month, 2 months, 3 months, 4 months, 5 months, 6 months, 7 months, 8 months, 9 months, 10 months, 11 months, 12 months, 13 months, 14 months, 15 months, 16 months, 17 months, 18 months, 24 months, 36 months, 48 months, or more.

Figure 21:
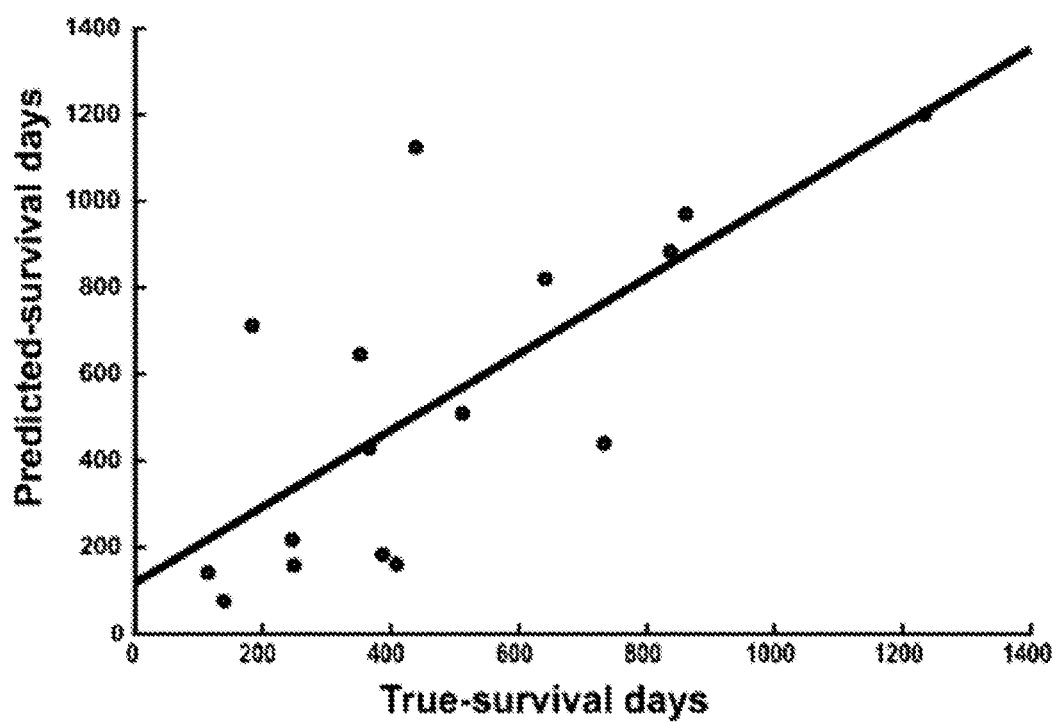
FIG. 21 is a graph comparing the number of survival days predicted by an SVM model to the actual number of survival days for a group of GBM patients; a linear regression is superimposed over individual patient data.

In other aspects, the machine learning model is a regression model configured to transform the functional connectivity matrix into a predicted survival duration of the patient. By way of non-limiting example, FIG. 21 is a graph summarizing the predicted survival durations obtained using a machine learning model for a group of glioblastoma multiforme patients, as a function of the actual survival duration of the patients.

Any suitable machine learning model and/or method may be used to transform the functional connectivity matrix into a predicted survival outcome. Non-limiting examples of suitable machine learning methods and algorithms include linear or logistic regression, instance-based algorithms, regularization algorithms, decision trees, Bayesian networks, cluster analysis, association rule learning, artificial neural networks, deep learning, dimensionality reduction, and support vector machines. In one aspect, the machine learning model is a deep convolutional neural network. In another aspect, the machine learning model is a support vector machine (SVM) with a linear kernel. By way of non-limiting example, the use of a linear SVM for predicting a survival outcome of a brain tumor patient is described in additional detail in the Examples below.

In various aspects, the machine learning model is trained using a training dataset that includes a plurality of functional connectivity matrices obtained as described above for a population of brain tumor patients and an associated plurality of survival outcomes. In some aspects, a portion of the features (matrix elements) of the functional connectivity matrix is transformed into the survival outcome by the machine learning model. Without being limited to any particular outcome, the availability of training data may influence the selection of features for analysis by the machine learning model. In some aspects, if the number of features greatly exceeds the number of functional connectivity matrices in the training database, overfitting or other confounding issues may occur.

In some aspects, a selected subset of features of the functional connectivity matrix are removed from the functional connectivity matrix prior to analysis by the machine learning model. In some aspects, the diagonal features of the functional connectivity matrix are non-informative and are removed. In other aspects, the upper diagonal features of the functional connectivity matrix are redundant with respect to the lower diagonal features, and consequently the upper diagonal features are removed. In additional aspects, at least a portion of the remaining lower diagonal features may be identified for removal using a dimensionality reduction method during training of the machine learning model.

II. Computing Systems and Devices

Figure 6:
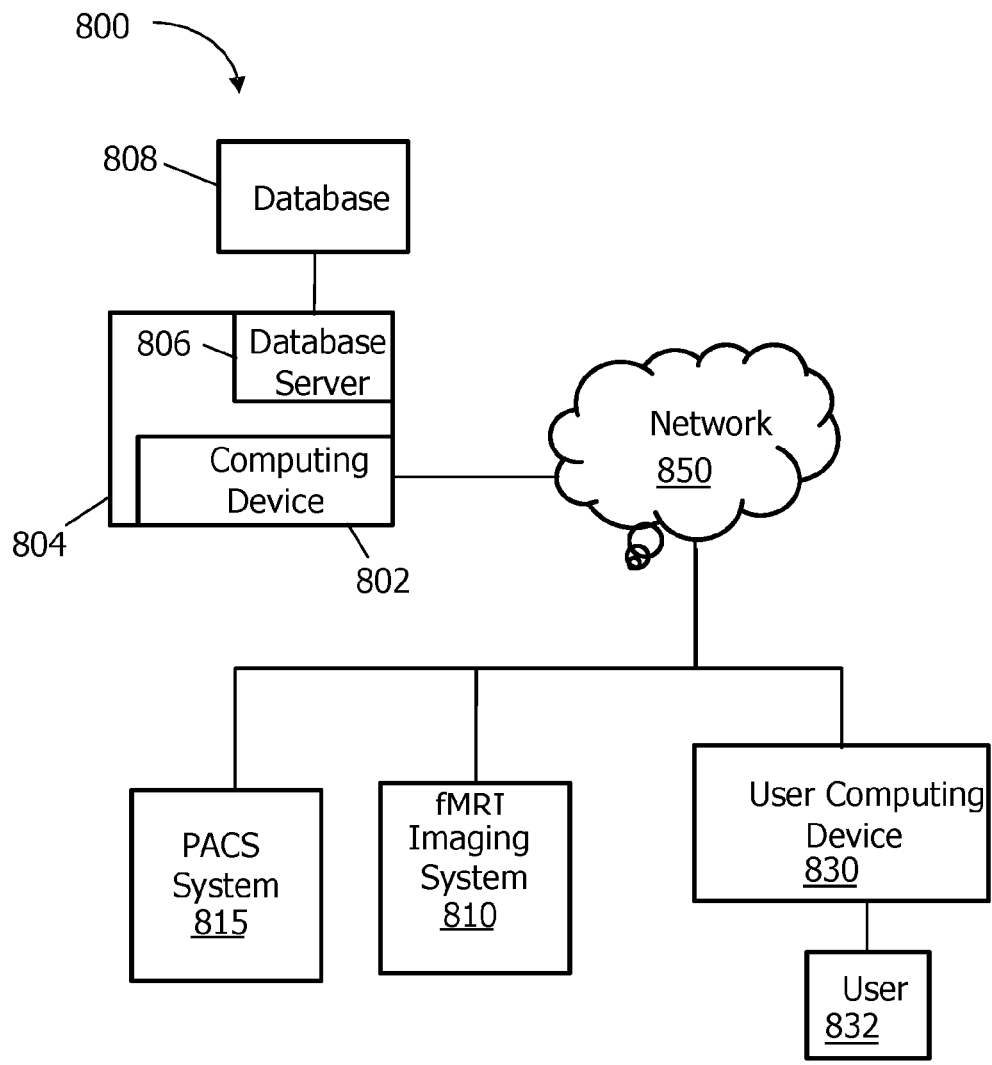
FIG. 6 is a block diagram schematically illustrating a system in accordance with one aspect of the disclosure.

FIG. 6 depicts a simplified block diagram of a system 800 for implementing the methods described herein. As illustrated in FIG. 6, the system 800 may be configured to implement at least a portion of the tasks associated with disclosed method. The system 800 may include a computing device 802. In one aspect, the computing device 802 is part of a server system 804, which also includes a database server 806. The computing device 802 is in communication with a database 808 through the database server 806. The computing device 802 is communicably coupled to the system 810 and a user computing device 830 through a network 850. The network 850 may be any network that allows local area or wide area communication between the devices. For example, the network 850 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user computing device 830 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In various other aspects, the computing device 802 is also communicably coupled to an fMRI imaging system 810 configured to obtain the fMRI data and optionally structural MRI data used to produce and interpret the biomarker using the methods described herein. In additional aspects, the computing device 802 is further communicably coupled to a picture archiving and communication system (PACS) 815 containing stored fMRI and/or structural MRI images used to produce and interpret the biomarker using the methods described herein.

Figure 7:
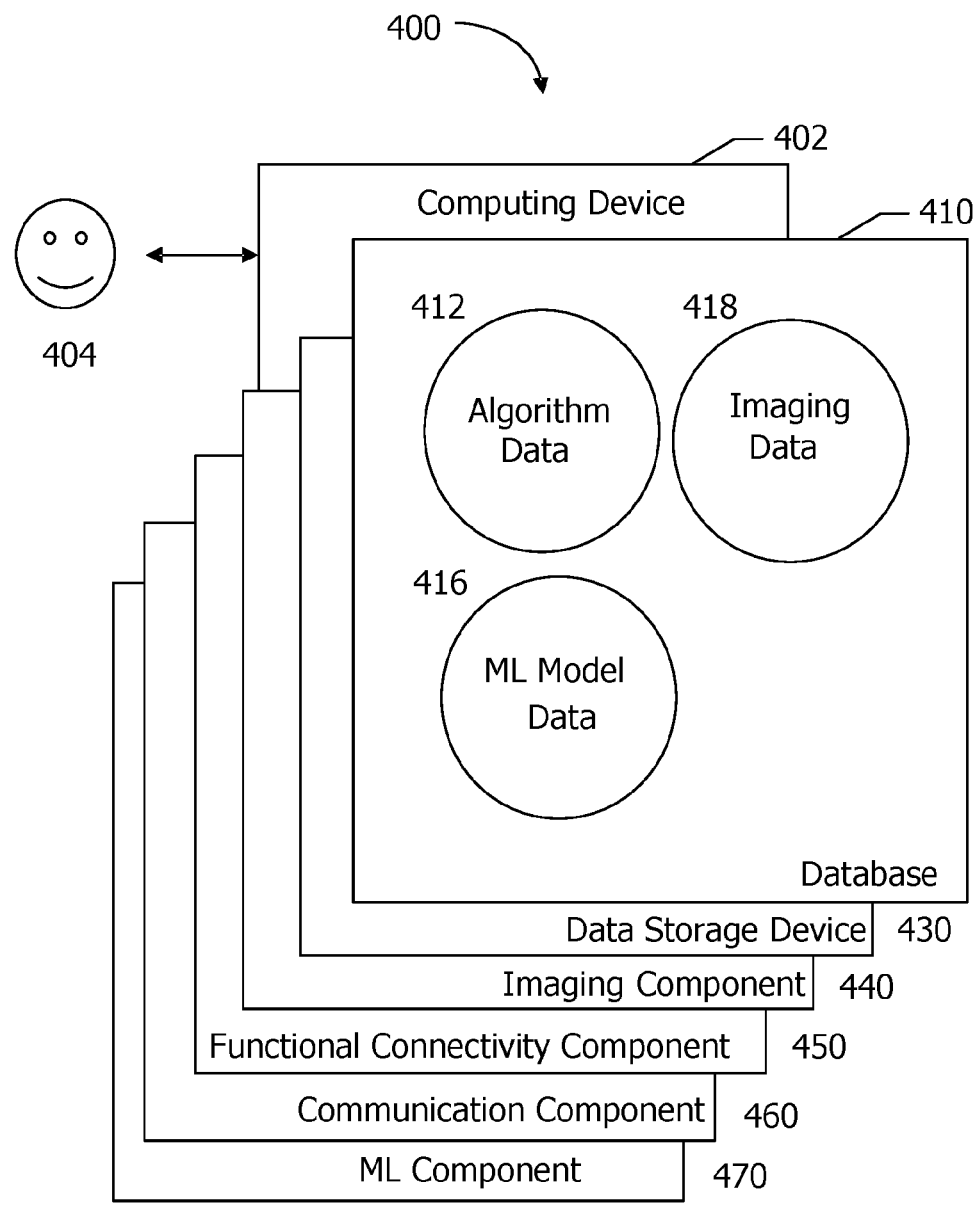
FIG. 7 is a block diagram schematically illustrating a computing device in accordance with one aspect of the disclosure.

In other aspects, the computing device 802 is configured to perform a plurality of tasks associated with the method of calculating the biomarker based on functional connectivity as described herein. FIG. 7 depicts a component configuration 400 of a computing device 402, which includes a database 410 along with other related computing components. In some aspects, the computing device 402 is similar to computing device 802 (shown in FIG. 6). A user 404 may access components of the computing device 402. In some aspects, the database 420 is similar to the database 808 (shown in FIG. 6).

In one aspect, the database 410 includes imaging data 418, algorithm data 412, and ML model data 416. Non-limiting examples of suitable imaging data 418 may include resting-state functional MR imaging (rs-fMRI) data that is analyzed to determine functional connectivity upon which the biomarker is based. Non-limiting examples of suitable algorithm data 412 include any values of parameters defining the calculation of correlations or correlation strengths used to define functional connectivity, the matrix elements of a functional connectivity matrix, and any other relevant parameter. Non-limiting examples of ML model data 416 include any values of parameters defining the machine learning used to predict a survival outcome based on the functional connectivity matrix of a brain tumor patient in accordance with the methods described above.

The computing device 402 also includes a number of components that perform specific tasks. In the example aspect, the computing device 402 includes a data storage device 430, an imaging component 440, a functional connectivity component 450, an ML component 470, and a communication component 460. The data storage device 430 is configured to store data received or generated by the computing device 402, such as any of the data stored in database 410 or any outputs of processes implemented by any component of the computing device 402. The imaging component 440 is configured to operate an fMRI imaging system 810 to obtain fMRI data and/or structural MRI data from a patient and/or to retrieve similar data from a PACS system 815. The functional connectivity component 450 is configured to produce the functional connectivity-based biomarkers using the methods described herein. The ML component 470 is configured to transform the functional connectivity-based biomarkers into predicted survival outcomes using a machine learning model as described herein.

The communication component 460 is configured to enable communications between the computing device 402 and other devices (e.g. user computing device 830, imaging system 810, and/or PACS system 815 shown in FIG. 6) over a network, such as network 850 (shown in FIG. 6), or a plurality of network connections using predefined network protocols such as TCP/IP (Transmission Control Protocol/Internet Protocol).

Figure 8:
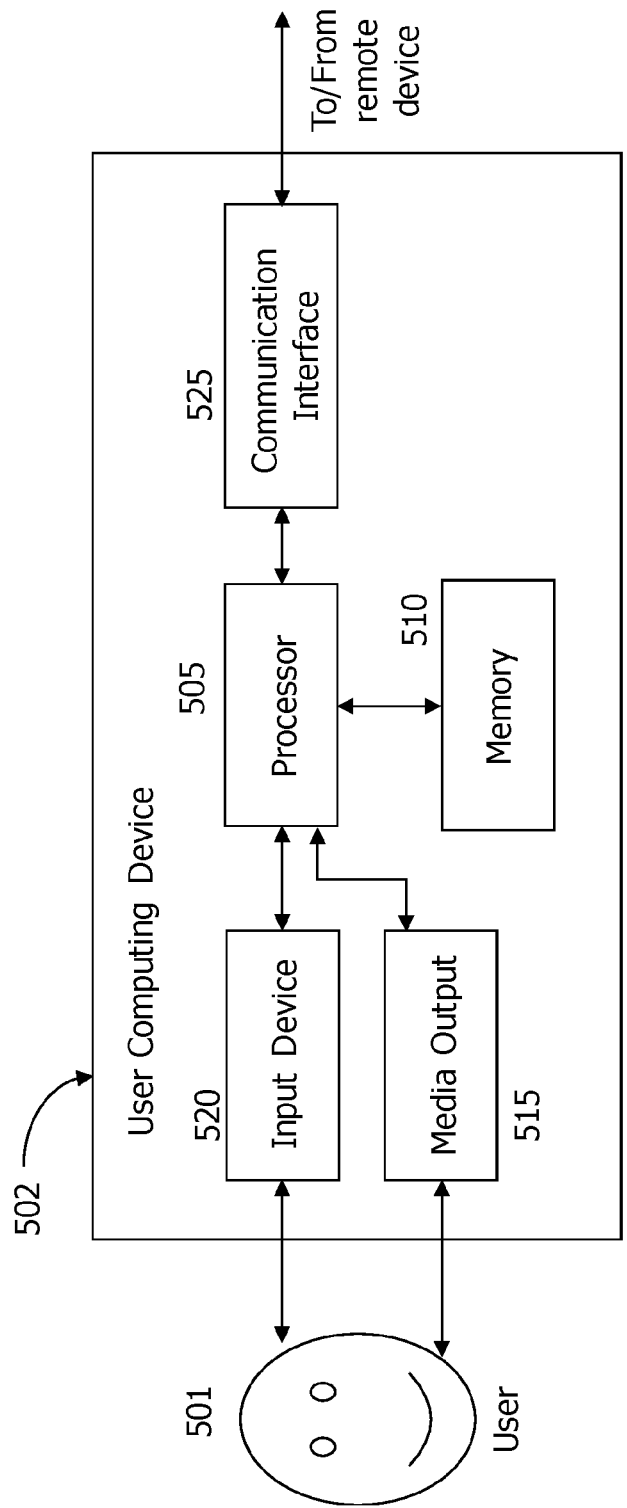
FIG. 8 is a block diagram schematically illustrating a remote or user computing device in accordance with one aspect of the disclosure.

FIG. 8 depicts a configuration of a remote or user computing device 502, such as the user computing device 830 (shown in FIG. 6). The computing device 502 may include a processor 505 for executing instructions. In some aspects, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 9:
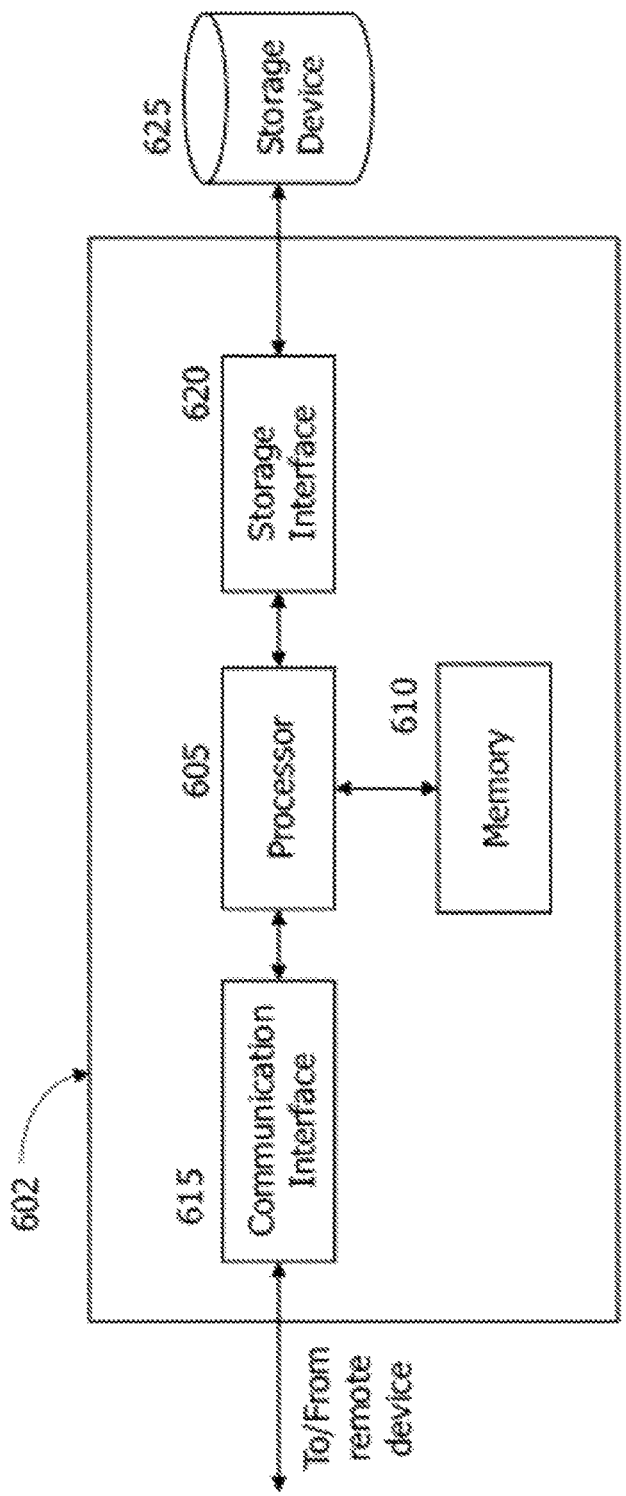
FIG. 9 is a block diagram schematically illustrating a server system in accordance with one aspect of the disclosure.

FIG. 9 illustrates an example configuration of a server system 602. Server system 602 may include, but is not limited to, database server 806 and computing device 802 (both shown in FIG. 6). In some aspects, server system 602 is similar to server system 804 (shown in FIG. 6). Server system 602 may include a processor 605 for executing instructions. Instructions may be stored in a memory area 625, for example. Processor 605 may include one or more processing units (e.g., in a multi-core configuration).

Processor 605 may be operatively coupled to a communication interface 615 such that server system 602 may be capable of communicating with a remote device such as user computing device 830 (shown in FIG. 6) or another server system 602. For example, communication interface 615 may receive requests from user computing device 830 via a network 850 (shown in FIG. 6).

Processor 605 may also be operatively coupled to a storage device 625. Storage device 625 may be any computer-operated hardware suitable for storing and/or retrieving data. In some aspects, storage device 625 may be integrated in server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIGS. 8) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local, remote, o cloud-based processors, transceivers, servers, and/or sensors (such as processors, transceivers, servers, and/or sensors mounted on vehicle or mobile devices, or associated with smart infrastructure or remote servers), and/or via computer executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may include but are not limited to: images or frames of a video, object characteristics, and object categorizations. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. ML outputs may include but are not limited to: a tracked shape output, categorization of an object, categorization of a type of motion, a diagnosis based on motion of an object, motion analysis of an object, and trained model parameters ML outputs may further include: speech recognition, image or video recognition, functional connectivity data, medical diagnoses, statistical or financial models, autonomous vehicle decision-making models, robotics behavior modeling, fraud detection analysis, user recommendations and personalization, game AI, skill acquisition, targeted marketing, big data visualization, weather forecasting, and/or information extracted about a computer device, a user, a home, a vehicle, or a party of a transaction. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function that maps outputs to inputs and utilize the predictive function to generate ML outputs based on data inputs. The example inputs and example outputs of the training data may include any of the data inputs or ML outputs described above. For example, a ML module may receive training data comprising customer identification and geographic information and an associated customer category, generate a model that maps customer categories to customer identification and geographic information, and generate a ML output comprising a customer category for subsequently received data inputs including customer identification and geographic information.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In one aspect, a ML module receives unlabeled data comprising customer purchase information, customer mobile device information, and customer geolocation information, and the ML module employs an unsupervised learning method such as "clustering" to identify patterns and organize the unlabeled data into meaningful groups. The newly organized data may be used, for example, to extract further information about a customer's spending habits.

In yet another aspect, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a sever computer. In a further aspect, the system is being run in a Windows® environment (Windows is a registered trademark of Microsoft Corporation, Redmond, Washington). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independent and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

EXAMPLES

The following examples illustrate various aspects of the disclosure.

Example 1: Intratumoral Functional Connectivity in Glioblastoma Multiforme Patients To demonstrate the predictive value of the strength of intratumoral functional connectivity (FC) measured in glioblastoma multiforme patients with respect to patient survival, the following experiments were conducted.

A. Methods i) Patient Population

Fifty-seven patients with new primary glioblastoma multiforme (GBM) underwent evaluation prior to surgical resection. The following inclusion criteria were used: new diagnosis of primary brain tumor; age more than 18 years; and clinical need for a magnetic resonance imaging (MRI) scan, including rs-fMRI as determined by the treating neurosurgeon. Exclusion criteria included prior surgery for brain tumor, inability to have an MRI scan, and patients with an MRI scan performed without rs-fMRI. For control analyses, clinically healthy adult data (n=100 subjects) were obtained.

ii) MRI Acquisition

Data were acquired using a Siemens 3T Trio or Skyra MRI scanner. T1-weighted (T1w), T2-weighted, FLAIR and gadolinium-contrast T1w fast spin echo imaging were obtained. Patients were scanned using a standard clinical presurgical tumor protocol. Anatomic imaging included T1-weighted (T1w) magnetization prepared rapid acquisition gradient echo (MPRAGE), T2-weighted (T2w) fast spin echo, fluid attenuated inversion recovery (FLAIR) imaging, and post-contrast T1w fast spin echo in 3 projections. The rs-fMRI was acquired using a T2* echo planar imaging sequence (voxel size 3 mm×3 mm×3 mm; echo time=27 milliseconds; repetition time=2.2-2.9 seconds; field of view=256 mm; flip angle=90°) for a total of 320 frames. In summary, the data were collected on Siemens Trio 3T scanners (Erlangen, Germany) using a 12-channel phased-array head coil. Using a high-resolution multiecho T1-weighted magnetization-prepared gradient-echo (MPRAGE) sequence, the structural data was acquired (TR=2200 ms, TI=1100 ms, TE=1.54 ms for image 1 to 7.01 ms for image 4, 1.2×1.2×1.2-mm voxels, field of view=230). fMRI data were collected using a gradient-echo echo planar imaging sequence sensitive to BOLD contrast (TR=3000 ms, TE=30 ms, voxel size (3 mm$^3$), flip angle 85°, field of view=216). 47 axial interleaved slices with no gap between slices were collected for whole brain coverage. Each BOLD run containing 124 volumes per run (6.2 min) were acquired per subject.

iii) MRI Pre-Processing

Preprocessing procedures to reduce artifacts included compensation for time shifts, rigid-body correction, white matter, CSF and global signal regression and low-pass temporal filtering. The rs-fMRI volumes were aligned with the structural images using affine transforms. Rs-fMRI preprocessing steps included compensation for slice-dependent time shifts, elimination of systemic odd-even slice intensity differences caused by interleaved acquisition, and rigid body correction for head movement within and across runs.

Atlas transformation was achieved by composition of affine transforms connecting the functional imaging volumes with the T2-weighted and T1-weighted structural images, resulting in a volumetric time series in isotropic 3 mm$^3$ atlas space. Additional preprocessing included spatial smoothing (6 mm full-width half-maximum Gaussian blur in each direction), voxel-wise removal of linear trends over each run, and temporal low pass filtering retaining frequencies less than 0.1 Hz. Spurious variance was reduced by regression of nuisance waveforms derived from head motion correction and extraction of the time series from regions of white matter and cerebrospinal fluid. The whole-brain (global) signal was included as a nuisance regressor. Frame censoring was performed to minimize the impact of head motion on the correlation results. Thus, frames (volumes) in which the root mean square (evaluated over the whole brain) change in voxel intensity relative to the previous frame exceeded 0.5% (relative to the whole-brain mean) were excluded from the functional connectivity computations.

iv) Tumor Segmentation

Using the software application ITK-SNAP, brain tumors were segmented semi-automatically using multimodal image acquisitions (T1w, gadolinium contrast T1w, T2w and FLAIR). This enabled the separation of necrotic regions, contrast-enhancing rims and FLAIR hyper-intense areas from normal cortical and subcortical tissue.

v) Resting-State Network Identification (Multilayer Perceptron)

A pre-trained multilayer perceptron (MLP) was utilized to identify 7 canonical resting-state networks (RSNs) in all patients. In summary, the MLP is a supervised classifier that was trained to map input data (correlation maps generated from predefined ROIs) to outputs with a priori class labels (FIG. 1C). Non-limiting examples of MLPs suitable for use in the methods described herein are described in U.S. Pat. No. 9,480,402, which is incorporated by referenced herein in its entirety. A winner-takes-all approach was utilized to assign voxels to the RSN with the highest probability of occurrence at that voxel. Additionally, the MLP output probability threshold was fixed at 0.95, which is representative of a typical clinical standard threshold. The voxels not meeting this threshold were ignored. For each patient, the number of voxels belonging to any RSN identified within the tumor and peritumoral edema regions was recorded.

vi) Resting-State Network Identification (Seed-Based)

Prior studies of functional connectivity led to the identification of 169 ROIs throughout the brain with each ROI belonging to one of seven canonical resting-state networks. Using the segmented contrast-enhanced bounded tumor and the peritumoral FLAIR hyperintense "edema" regions as masks, the ROIs found within those areas were identified (FIG. 1D). To create a time series for each resting-state network, the voxels within each network-specific ROI outside of the tumor and peritumoral regions (i.e. extratumoral regions) were averaged together according to the following equation:

$$B(t)_i = \frac{1}{R_i} \sum_{r_i=1}^{R_i} \left( \frac{1}{V_{r_i}} \sum_{v_{r_i}=1}^{V_{r_i}} b(t)_{v_{r_i}} \right)$$

where b(t) is the BOLD time series for each voxel (v) within an extratumoral ROI (r) belonging to each resting-state network (i) (i ranges from 1 to 7 corresponding to each network). $V_{r_i}$ is the total number of voxels in each extratumoral RSN ROI, $R_i$ is the total number of network-specific extratumoral ROIs and B (t) is the resultant mean BOLD time series for each network i.

Using Pearson correlation, the network BOLD time series were then correlated with their corresponding network ROIs found within the contrast-enhanced tumor to obtain the intra-network connectivity strength for that ROI. Additionally, the BOLD time series of each network was correlated with the time series for each voxel found within the segmented tumor to identify the correlation strength of each voxel to every network.

Computed correlations were Fisher z-transformed, and a conservative threshold of r>0.3 was used to denote the presence of functional connectivity of a voxel to a particular network. Using corresponding imaging data from 100 controls, each control was treated as every GBM patient, and each patient-derived tumor and peritumor masks were used to create virtual tumor and peritumor lesions respectively in the controls. The seed-based methods described above were then performed in each control.

vii) Resting-State BOLD Power Spectral Density and Autocorrelation Analysis

To account for frame censoring of the resting-state BOLD time-series, linear interpolation was performed on the removed frames. The interpolated time-series for MLP-assigned voxels within the tumor, non-MLP-assigned voxels within the tumor as well as MLP-assigned voxels outside of the peritumoral regions were then used to compute the autocorrelation and the BOLD signal power within the frequency range 0.01-0.01 Hz using Welch's method in MATLAB (MathWorks, Inc., Natick, MA). The average autocorrelation and power spectrum was then calculated for each group.

viii) Statistical Analysis

Statistical analysis was performed in Excel (Microsoft Corporation, Redmond, Washington), R (R Foundation for Statistical Computing, Vienna, Austria) and MATLAB. The Shapiro-Wilk test for normality was performed on all continuous variables with the non-parametric Wilcoxon Signed Rank and Sum Rank tests used to compare variables between groups. The log-rank test was used to compare Kaplan-Meier survival curves of intratumor connectivity derived via ROIs and voxel-wise (n=31). Bonferroni correction was applied to correct for multiple comparisons.

Additionally, univariate and multivariate cox regression was employed to compare the effects of covariates (age, gender, tumor volume, Karnofsky Performance Score (KPS), intratumor voxelwise network connectivity peritumoral edema volume, extent of resection, MGMT status, IDH mutation, EGFR amplification status, intratumor ROI intra-network connectivity) on survival. A threshold (alpha) of 0.05 was used to indicate statistical significance.

B. Results i) GBM Intratumor Functional Connectivity was Identifiable in Most Patients A total of 57 patients with a histological diagnosis of de novo GBM were chosen for this study. The characteristics of the selected GBM patients are summarized in Table 1 below.

TABLE 1

Demographic and Clinical characteristics of GBM patients
Summary of Characteristics

| | |
|---|---|
| No. of patients | 57 |
| Mean age in yrs. (range) | 57.8 ± 13.9 (21.4-83.4) |
| Sex | |
| Male | 42 |
| Female | 15 |
| CE volume (cm³) | 39.5 ± 34.9 |
| FLAIR volume (cm³) | 116.0 ± 73.0 |
| Extent of resection | |
| Gross-total | 25 |
| Subtotal | 27 |
| Biopsy | 1 |
| Laser | 4 |
| MGMT status | |
| Methylated | 23 |
| Non-methylated | 31 |
| Missing | 3 |
| IDH mutation | |
| Mutated | 5 |
| Wild type | 51 |
| Missing | 1 |
| EGFR Amplification | |
| Positive | 17 |
| Negative | 21 |
| Missing | 19 |

CE = contrast enhancement;
FLAIR = peritumoral fluid attenuated inversion recovery hyperintensity;
Mean values are presented with SDs As described in Table 1, there were 15 females and 42 males. The average age was 57.8±13.9 years, with a range of 21 to 83 years. Most of the patients had either a partial (n=27) or complete (n=25) resection which was followed by chemotherapy and radiation. Genetic studies were performed for most of the GBM patients (Table 1). These included O[6]-methylguanine-DNA methyltransferase (MGMT) promoter methylation, isocitrate dehydrogenase-1 R132 (IDH-1) mutation and epidermal growth factor receptor (EGFR) amplification. 23 out of 54 patients whose status was recorded (42.6%) showed MGMT methylation, only 5 out of 56 had confirmed IDH-1 mutations (8.9%), while 17 out of 37 were positive for EGFR amplification (44.7%).

The brains of the patients were subjected to post-contrast T1w imaging. FIG. 1A contains image slices from eight patient images numbered 1-8, respectively. Each of the image slices of FIG. 1A include T1-weighted contrast enhancement hyperintensity and T1-weighted hypo-intensity typically attributed to necrosis and taken in comparison highlight the heterogeneity of GBM location, size and morphology.

Figure 1B:
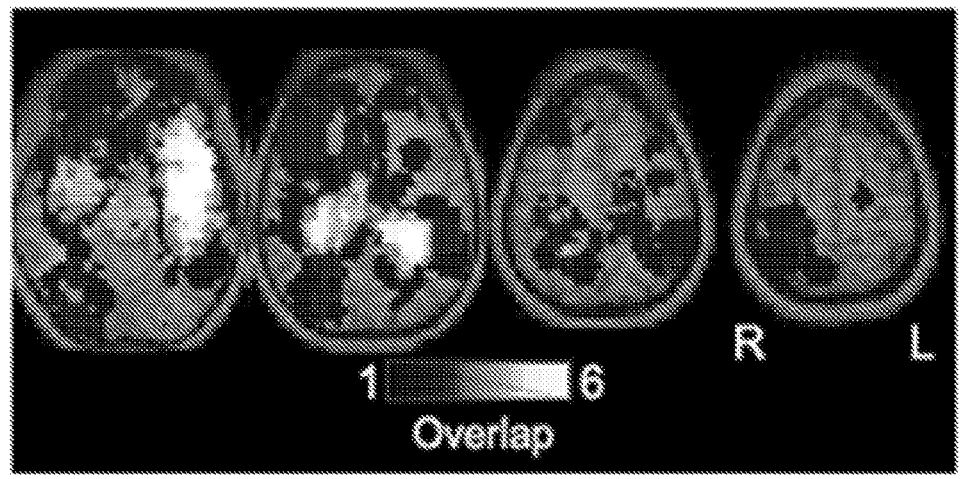
FIG. 1B contains a series of heat maps showing tumor overlap in 57 patients at 4 slice locations. The color bar indicates the number of subjects with a tumor lesion in each voxel.
Figure 1C:
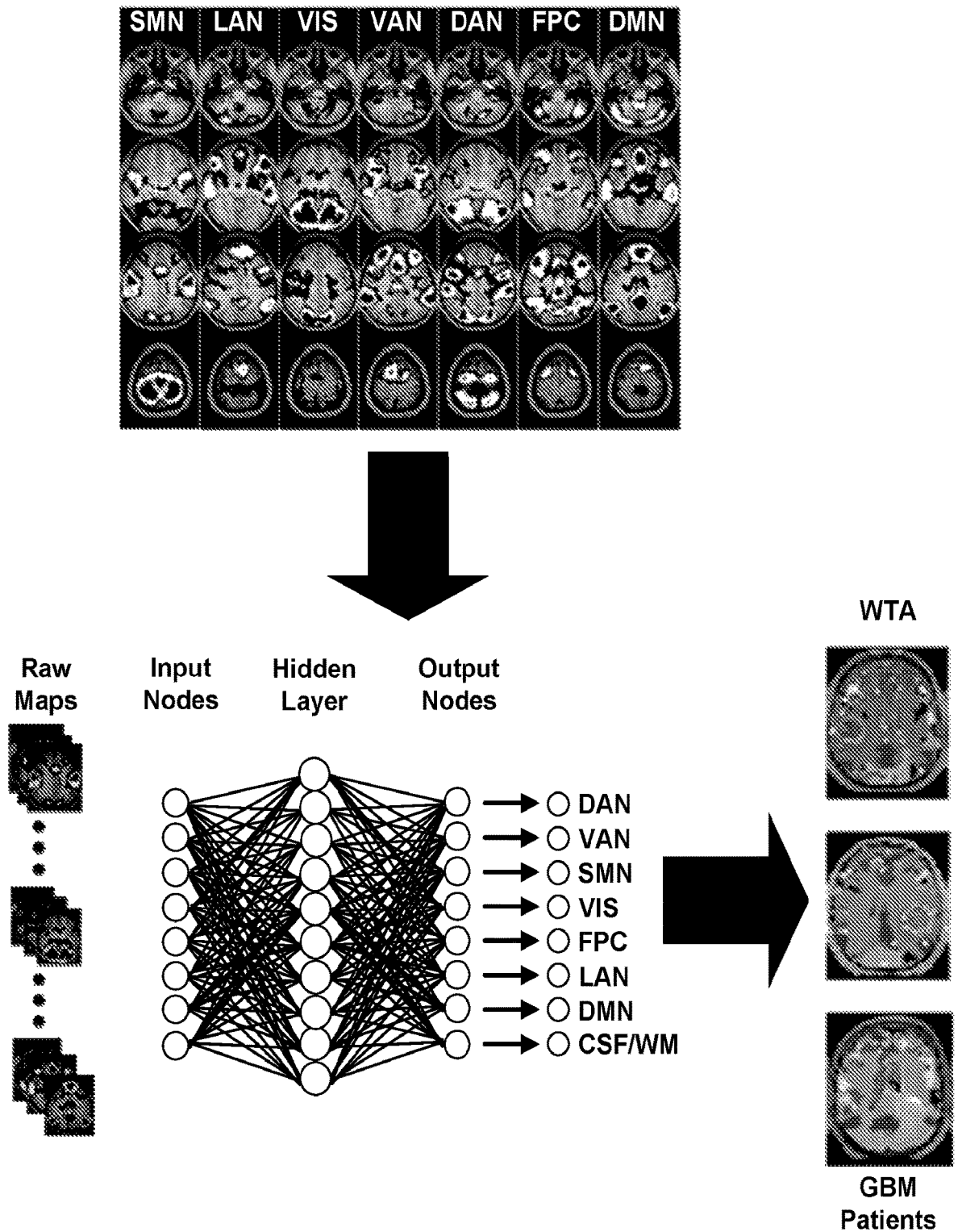
FIG. 1C is a schematic diagram illustrating the classification of resting-state networks using the MLP algorithm. During training, voxel-wise correlation maps are obtained from rs-fMRI data using only gray matter voxels. The images are then passed to the MLP algorithm, which produces RSN maps for the dorsal attention network (DAN), ventral attention network (VAN), somatomotor network (SMN), visual network (VIS), fronto-parietal control (FPC), language network (LAN) and default mode network (DMN). For the GBM patients, a winner-takes-all (WTA) approach is used to assign voxels to one of seven canonical resting-state networks followed by a probability threshold of 0.95.
Figure 1D:
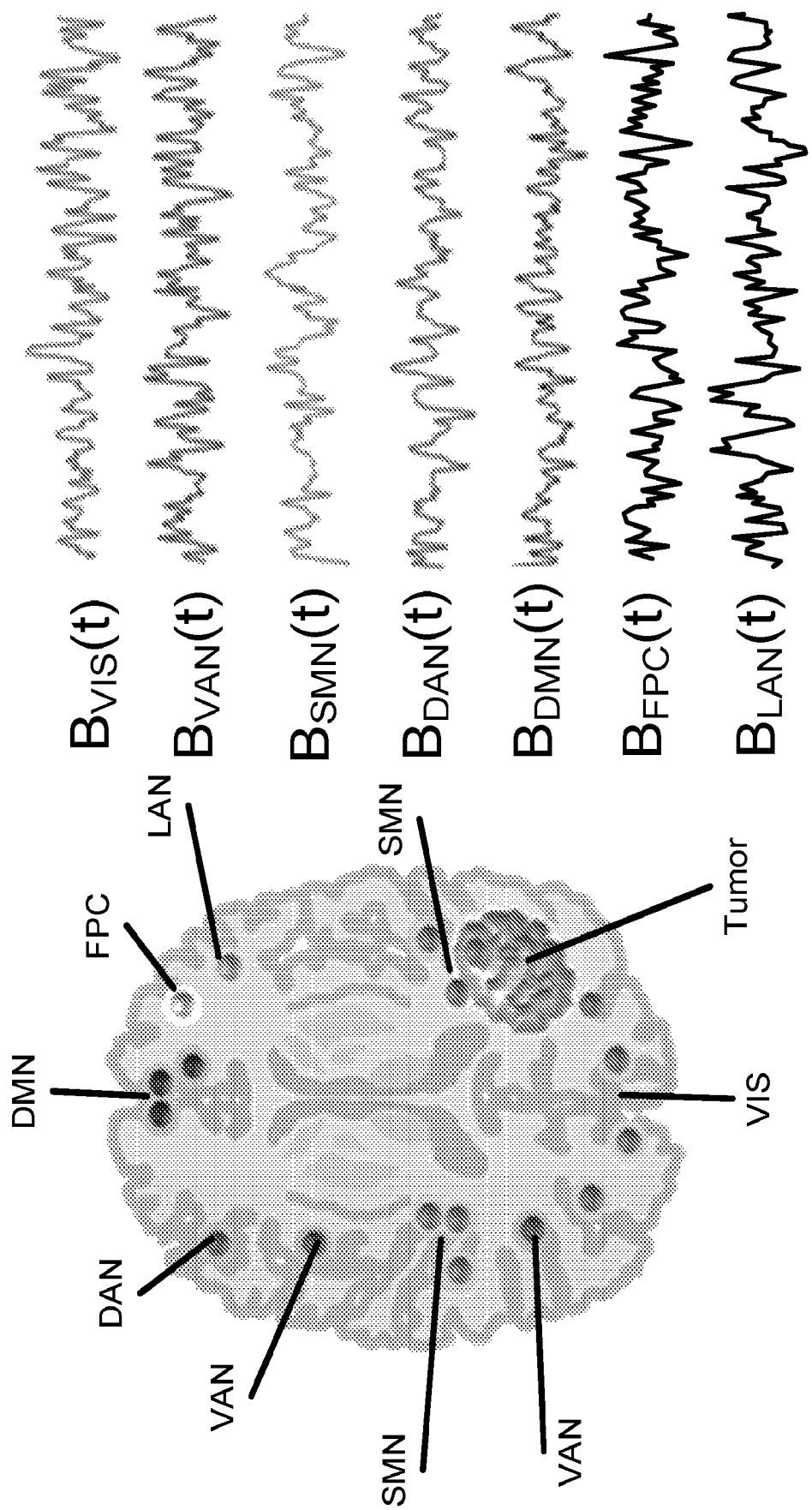
FIG. 1D is a schematic diagram illustrating intratumor function assignments using a priori ROIs. The signals of all the ROIs belonging to a specific resting-state network outside of the tumor and peritumoral edema regions are averaged together to obtain a representative signal for that network. Each signal is either then correlated to the corresponding network ROI signal if found within the contrast-enhanced tumor regions or to all the voxels found within the tumor.
Figure 1E:
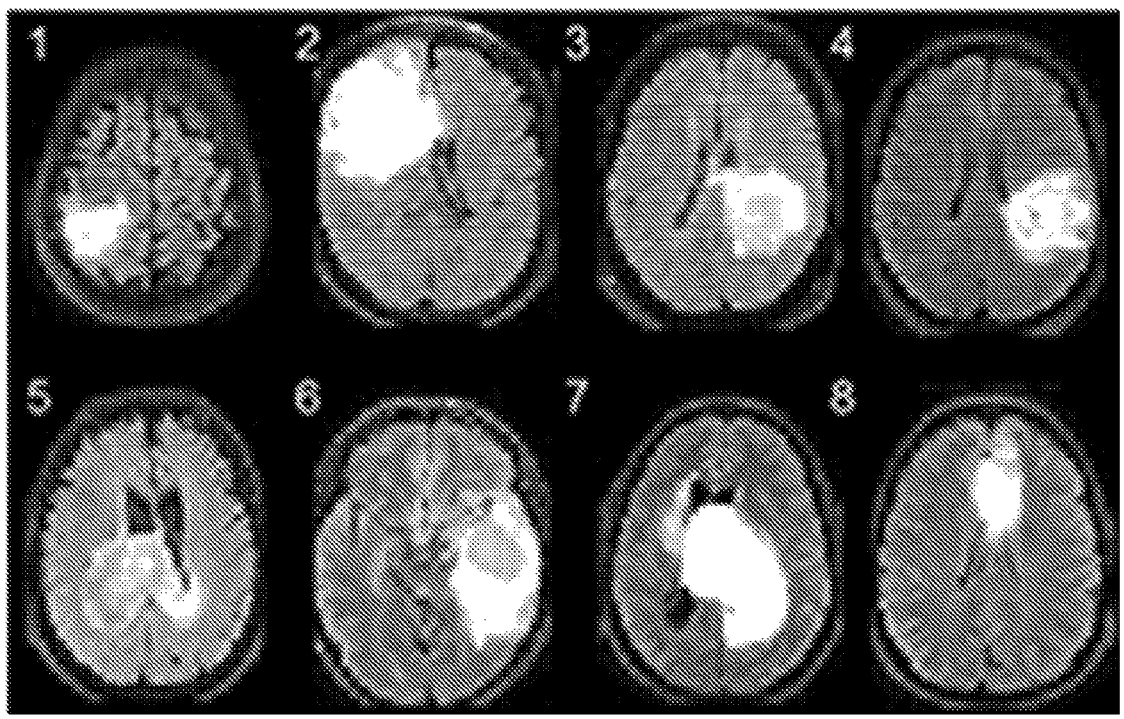
FIG. 1E contains a series of T2-FLAIR images (T2+FLAIR) labelled 1-8 corresponding to the patient images of FIG. 1A. The images highlight the FLAIR hyperintensity at the same locations as FIG. 1A.
Figure 1F:
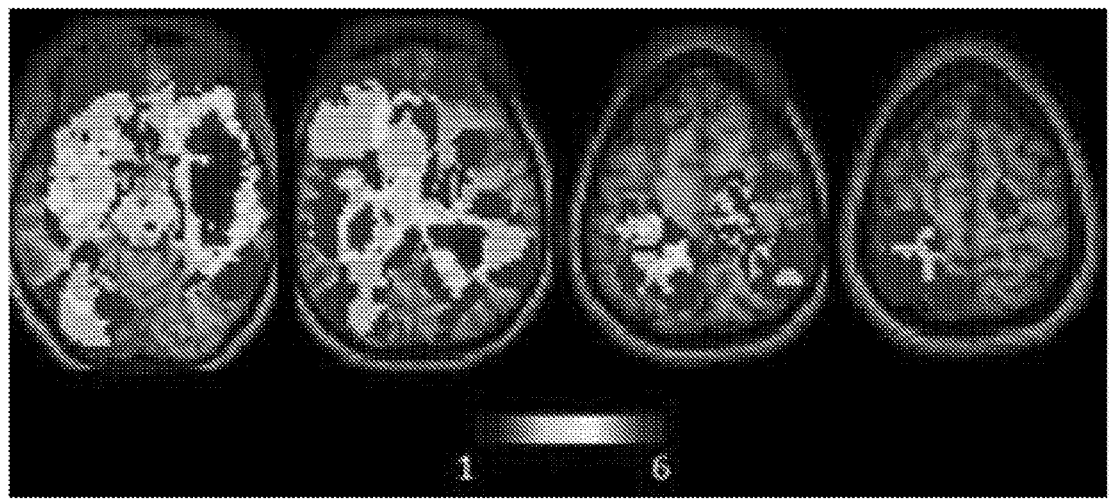
FIG. 1F contains a series of heat maps showing the FLAIR hyperintensity and hypo-intensity overlap in 57 patients at 4 slice locations. The color bar indicates the number of subjects with a tumor lesion in each voxel.

In FIG. 1B, heat maps indicating the tumor locations (as defined by contrast-enhanced boundaries in T1w) reveal the distribution of GBM tumors throughout the brain. Of the 57 patients, 29 had GBMs in the left hemisphere (50.9%), 24 in the right hemisphere while 4 patients had tumors involving both hemispheres (7%). Eight slices each taken from a separate patient using T1+contrast imaging (see FIG. 1A) and T2-FLAIR imaging (see FIG. 1E) highlight the wide variability of the structural tissue property changes that occur in association with glioblastoma.

Two resting-state functional connectivity paradigms were employed to characterize intratumoral function as described above. The first involved the use of a pre-trained multilayer perceptron (MLP) algorithm to probabilistically assign each voxel to one of seven canonical resting-state network using a winner-takes-all (WTA) criterion as well as a threshold greater than 0.95 (FIG. 1C). The second method utilized seed-based correlation analyses to identify the correlation strengths of a priori regions of interest (ROIs) found within contrast-enhanced tumor boundaries and individual tumor voxels to representative network-specific time series generated from a priori ROIs found outside of peritumoral areas (FIG. 1D).

With the pre-trained MLP algorithm, an initial qualitative assessment of function within and beyond tumor margins was performed. A pre-validated multilayer perceptron algorithm was successfully applied to 57 patients having <25% frames deemed unusable due to motion. One of seven canonical resting-state networks was assigned to each voxel using a winner-takes-all approach where the network having the highest probability of being assigned to that voxel was accepted. The RSN maps were thresholded using 0.95 as the cutoff to limit false positives to 5% and also commensurate with typical clinical standards.

Figure 2A:
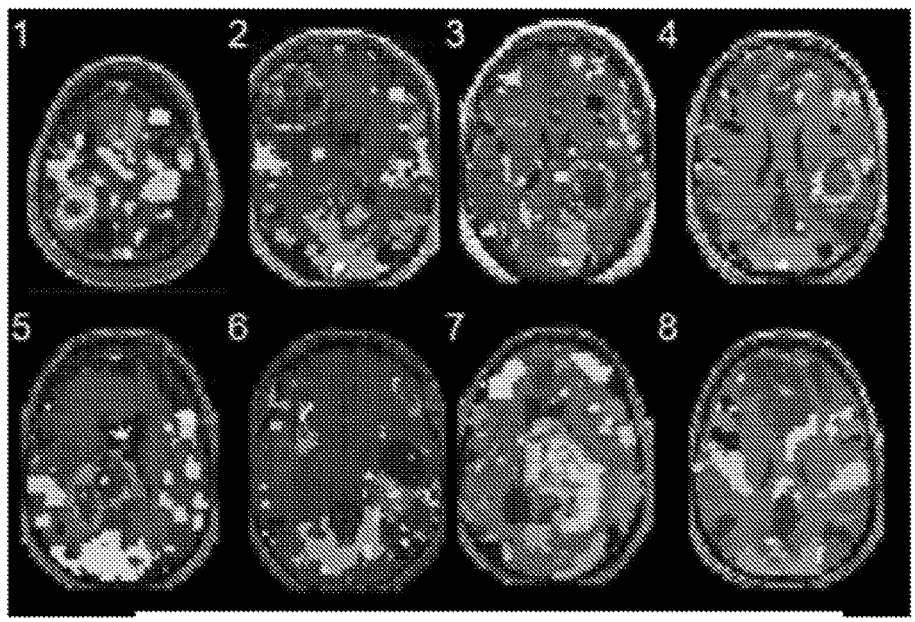
FIG. 2A contains a series of multilayer perceptron winner-take-all RSN maps overlaid on T1-weighted contrast enhancement images from the same 8 patients as shown in FIG. 1A. RSNs highlighted include language network (LAN), sensorimotor network (SMN), visual network (VIS), dorsal attention network (DAN), ventral attention network (VAN), frontoparietal control network (FPC) and default mode network (DMN) and reveal the variability of function across the brain and within tumor boundaries as defined by contrast enhancement.
Figure 2B:
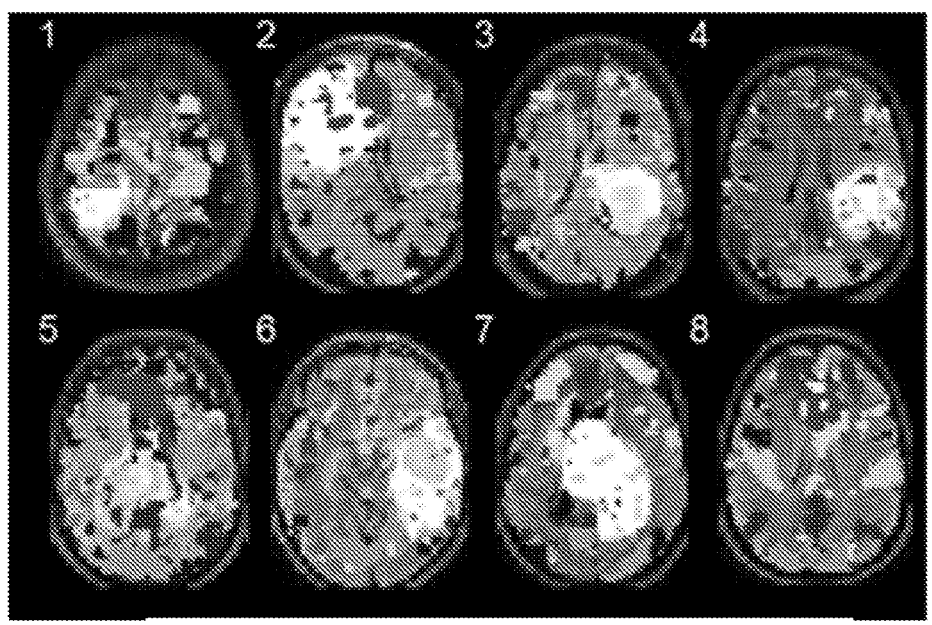
FIG. 2B contains the identical series of multilayer perceptron winner-take-all RSN maps from FIG. 2A overlaid on top of the patient T2-FLAIR images of FIG. 1E. Highlighted RSNs are the same as the RSNs highlighted in FIG. 2A and reveal the variability of function within the peritumoral "edema" as defined by FLAIR hyperintensity.

FIGS. 2A and 2B highlight 8 GBM patients with their corresponding MLP-assigned RSN maps overlaid onto representative slices of their post-contrast T1w and FLAIR images, respectively. The slices shown in FIGS. 2A and 2B correspond to the slices shown in FIG. 1A. There exists variability in tumor size and location as well as the amount and type of RSN voxels (i.e. functional network heterogeneity) found within the tumor boundaries. For example, patients 1 and 3 appear to show limited involvement of RSNs within the tumor margins whereas ventral attention network (VAN) voxels can be distinctly identified in patient 8's tumor at that slice (highlighted by arrows).

Given that limited studies have investigated the prevalence of functional tissue within tumors and that the reported results have focused solely on eloquent cortex, the prevalence of functional tissue within the tumor borders defined by gadolinium contrast enhancement as well as the peritumoral regions defined by FLAIR hyperintensity were characterized. 98.3% (n=56) of tumors had retained functional tissue within the contrast-enhanced boundaries. For a given tumor with preserved functional networks, the mean and median volume of functional tissue were 7.09 cm$^3$ and 4.43 cm$^3$ respectively, with a range of 0.054-43.5 cm$^3$. There was a strong correlation between tumor size and the amount of network voxels within tumor boundaries ($r^2$=0.621, p<0.0001). Separating the hyper-intense contrast-enhanced regions from the hypo-intense regions within the tumors led to a significant difference between the amounts of functional tissue found at each location with the former having approximately 2.29× more functional tissue than the latter (4.85 cm$^3$ vs 2.12 cm$^3$, p<0.0001). However, after normalizing for the volumes of each region, the proportional differences were not significant (contrast-enhanced region=0.20 vs hypo-intense region=0.18, p=0.204).

Figure 10A:
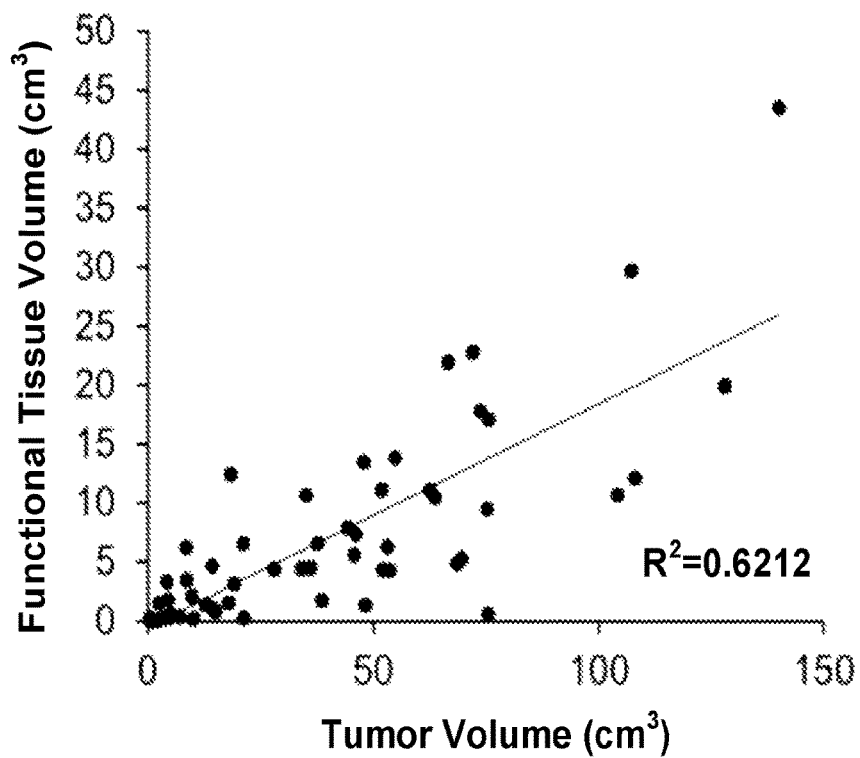
FIG. 10A is a graph showing a relationship between functional tissue volume found within contrast-enhanced tumor boundaries and tumor volume.
Figure 10B:
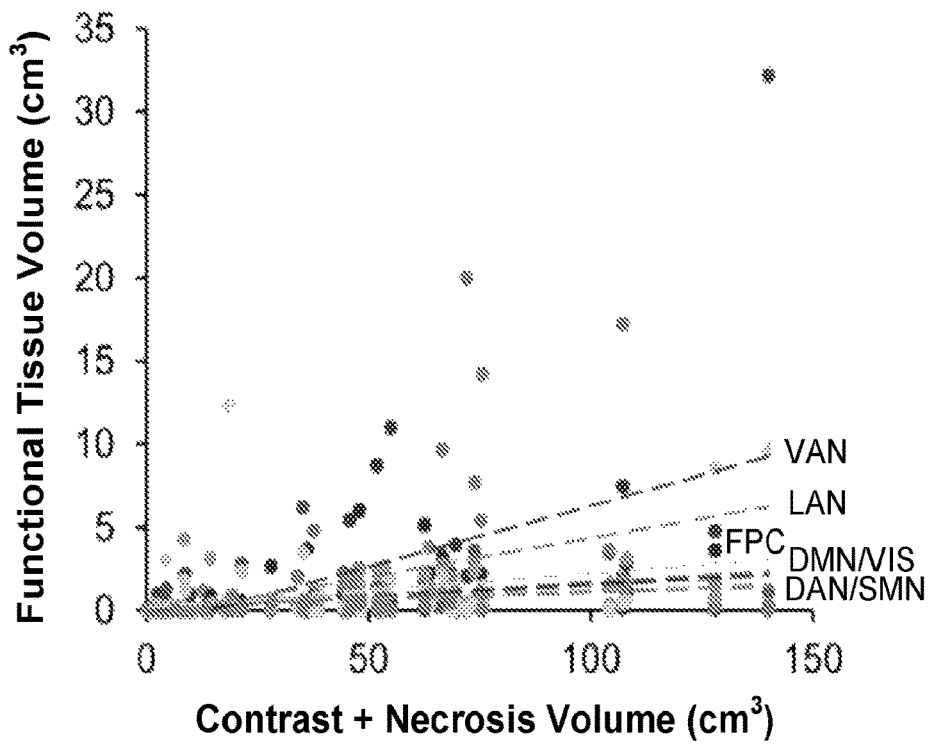
FIG. 10B is a graph showing a relationship between functional tissue volume within tumor-associated regions as defined by contrast-enhancement boundaries and tumor size (contrast-enhanced regions and hypointense "necrotic" regions). Symbol colors indicate membership to one of the 7 RSNs.
Figure 10C:
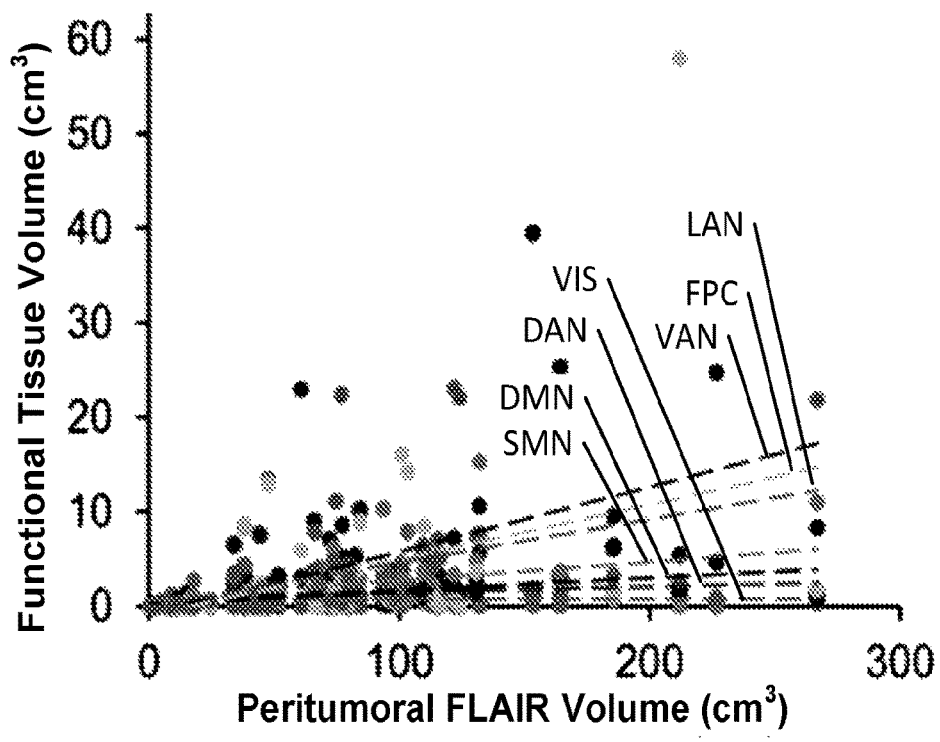
FIG. 10C is a graph showing a relationship between volume of functional tissue found within peritumoral hyperintense FLAIR regions and volume of peritumoral FLAIR hyperintensity. Symbol colors indicate membership to one of the 7 RSNs.

Of the functional voxels found within the contrast enhancement boundaries of the tumors, the amount of network voxels was correlated with the size of the tumor for all networks, as illustrated in FIG. 10B. The $r^2$ values ranged from 0.073-0.30 with dorsal attention network (p<0.05) and ventral attention network (p<0.0001) having the weakest and strongest correlations, respectively. With the exception of vision network ($r^2$=0.000001, p=0.99), and dorsal attention network related tissue ($r^2$=0.03, p=0.24), the amount of functional tissue was correlated with the size of the peritumoral region, as illustrated in FIG. 10C. The strongest correlation was obtained from the ventral attention network ($r^2$=0.29, p<0.0001).

Figure 10D:
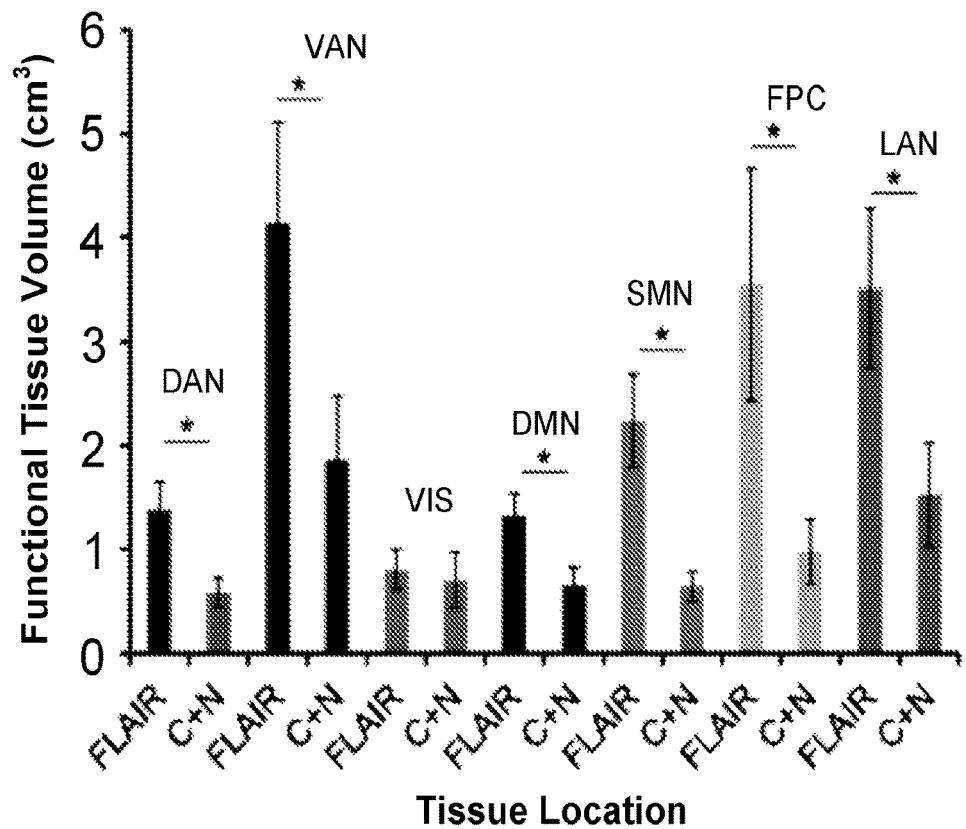
FIG. 10D is a graph comparing the mean volume of preserved functional tissue assigned to each RSN in contrast-enhanced and necrotic (C+N) regions and in peritumoral FLAIR hyperintensity regions (FLAIR). * denotes p<0.05 significant differences between tissue locations corresponding to the same network. Bar colors denote the assigned RSN.
Figure 10E:
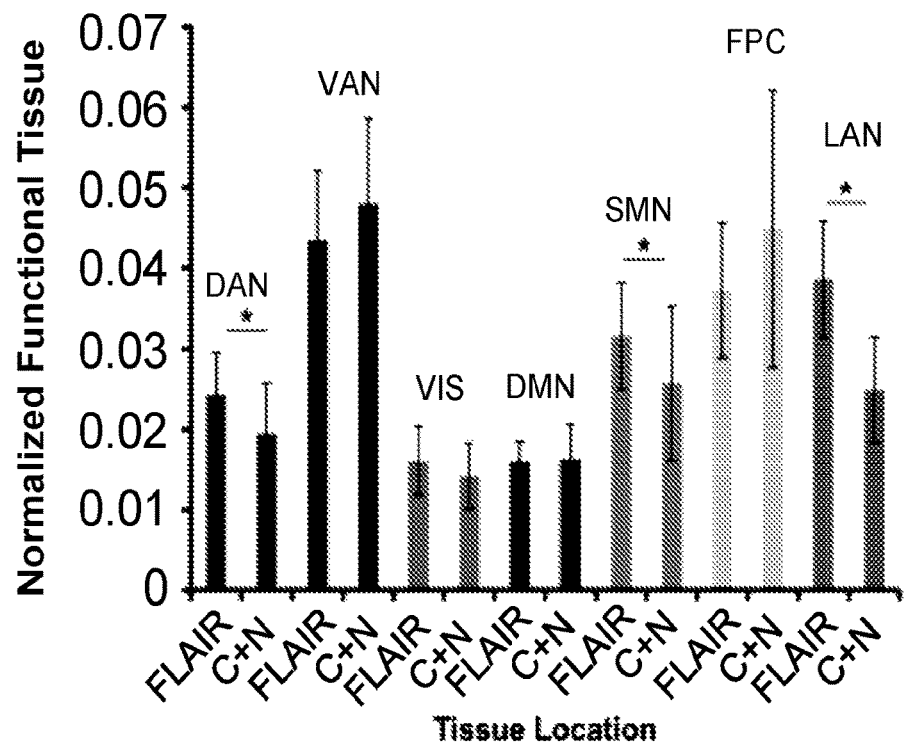
FIG. 10E is a graph comparing the preserved functional tissue in contrast-enhanced and necrotic (C+N) regions and peritumoral FLAIR hyperintensity (FLAIR) normalized by their respective tissue volumes in each patient. * denotes p<0.05 significant differences between tissue locations corresponding to the same network. Bar colors denote the assigned RSN.
Figure 10F:
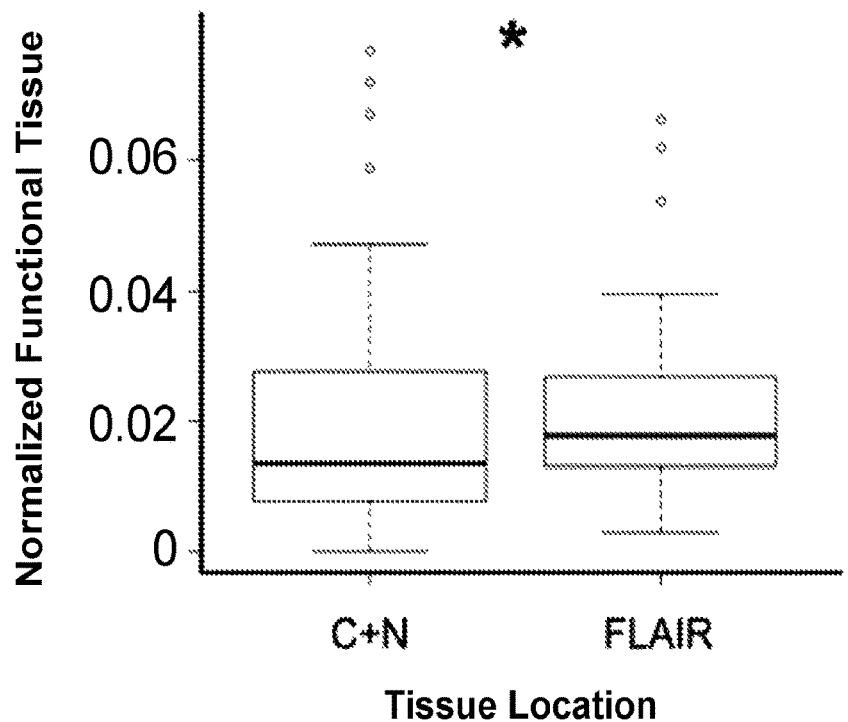
FIG. 10F contains box plots depicting the amount of functional tissue in contrast-enhanced and necrotic (C+N) regions and peritumoral hyperintensity (FLAIR) normalized by their respective tissue volumes in each patient. * denotes p<0.05 significant differences between tissue locations.

Additional analysis was performed to determine whether any quantitative differences existed between the number of functional voxels identified by the MLP within the tumor and peritumoral regions for each network. Significant differences between the voxel distributions of the tumor and peritumoral regions were found for all networks except for the vision network (p=0.175), with the peritumoral region having a greater amount of functional tissue on average compared to the tumor volume, as summarized in FIG. 10D. However, due to the positive relationship observed between peritumoral region size, tumor size and functional voxels, this was subsequently controlled for by normalizing the number of network voxels within each region by their respective sizes. With normalization, only dorsal attention network (p=0.006), somatomotor network (p=0.002) and language network (p<0.001) retained significance with peritumoral regions containing a greater proportion of those network voxels than tumor regions, as summarized in FIG. 10E. Collectively, peritumoral regions had a greater proportion of network voxels than tumor regions (p=0.009) as shown in FIG. 10F.

To investigate the potential role of the tumor microenvironment on preserved function, the proportion of functional tissue present in each tumor by brain location was calculated. Using a labelled gray matter template for nine brain regions, each patient's tumor (bounded by contrast-enhancement) and functional tissue was subdivided by their presence in each region. The amount of preserved functional tissue in each brain region was then normalized by the amount of tumor tissue at that location. No patient had cerebellar tumors. There was wide variability in the total proportion of preserved functional tissue as well as in the amount for each RSN. On average, tumors in the frontal lobe had the greatest proportion of preserved functional tissue while thalamus tumors had the lowest (0.2931 vs 0.081. p<0.0001), as summarized in FIG. 11.

Figure 2C:
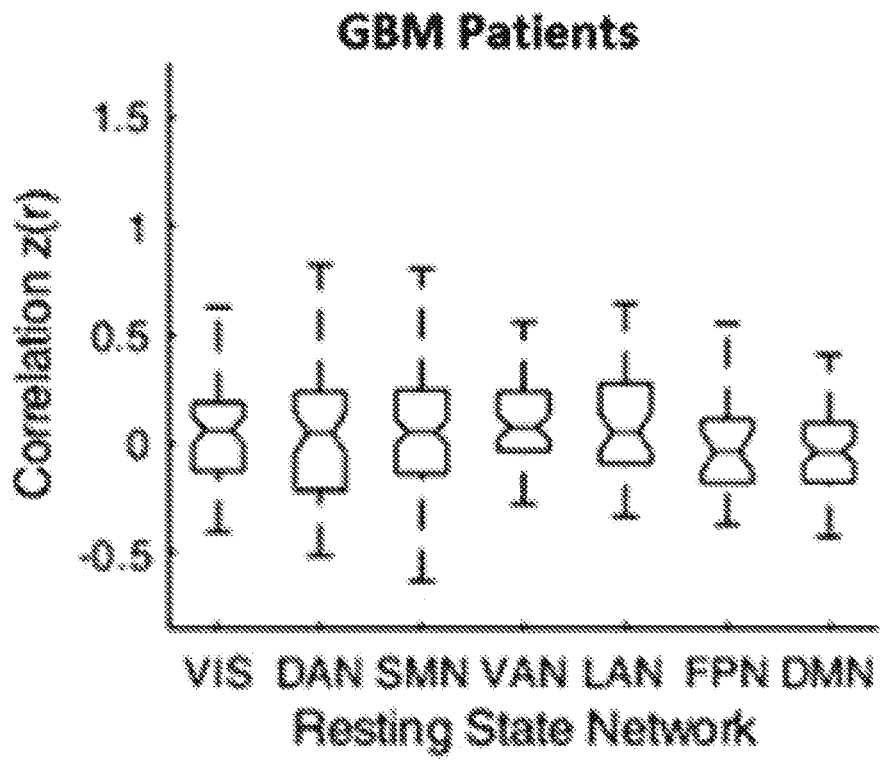
FIG. 2C is a graph summarizing the Fisher z transformed intratumor ROI network connectivity for GBM patients. The intra-network connectivity strength of each ROI found within a patient's tumor was used to generate the boxplot corresponding to that ROI's assigned network. The mean of the VIS, DAN, FPN and DMN distributions were not significantly different from zero (one sample t-test, P>0.05), however some patients had ROIs at or greater than 0.5.
Figure 2D:
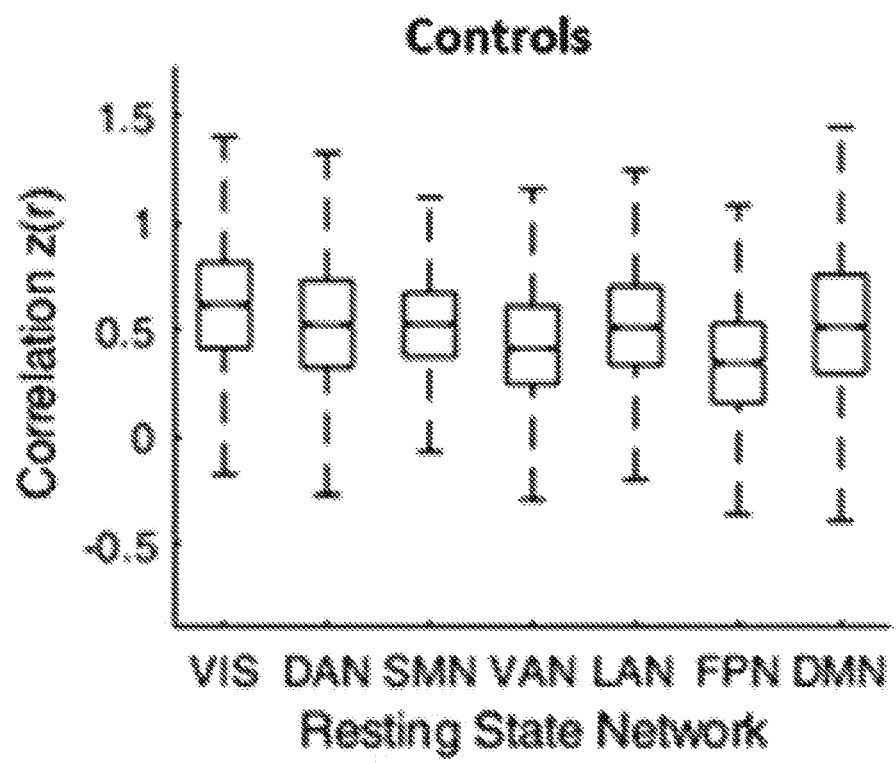
FIG. 2D is a graph summarizing the virtual intratumor ROI network connectivity for controls. Each control (n=100) was treated as every GBM patient (n=53) to obtain the expected connectivity strengths and overall intra-network distributions for the ROIs found within the tumors of each GBM patient. The median of every network in controls was greater than its corresponding distribution in GBM patients (two-sample t-test, P<0.00001).
Figure 2E:
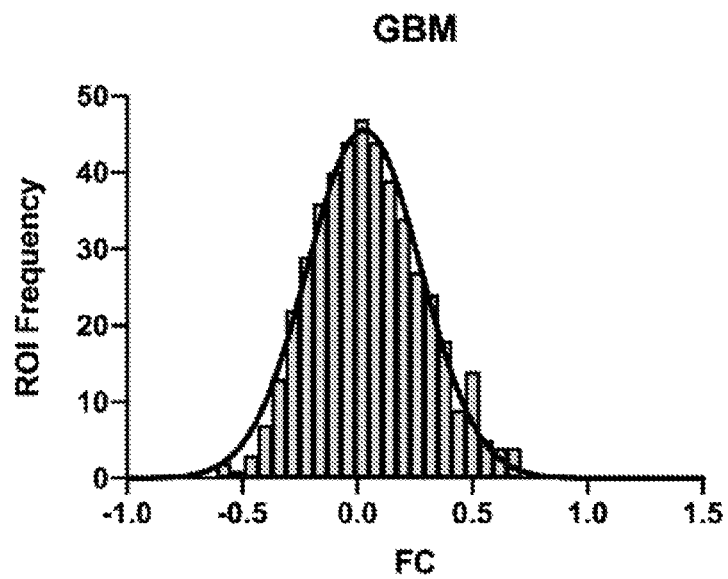
FIG. 2E is a histogram showing the intra-network connectivity distribution for ROIs overlapping with tumor regions of the GBM patients.
Figure 2F:
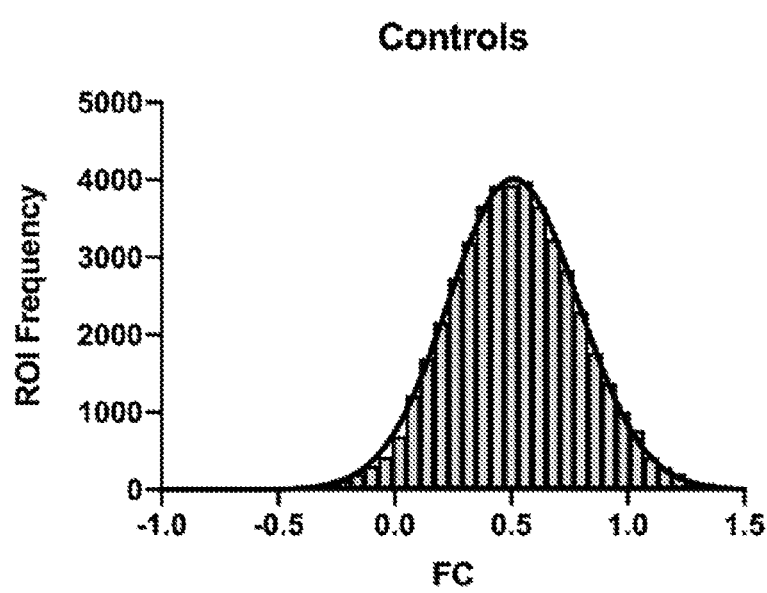
FIG. 2F is a histogram showing the intra-network connectivity distribution for ROIs of healthy controls corresponding to the tumor regions of FIG. 2E.

To quantify the prevalence of intratumor function by network across all GBM patients, the Fisher's z transformed correlation strength distribution of a priori within-tumor ROIs to their respective extratumoral networks were plotted in FIG. 2C. 93% of GBM patients had at least one intratumor ROI. Averaging over patients, the mean number of intratumor ROIs per RSN ranged from 0.40 to 2.44. The median correlation strength of each network ranged between −0.035 to 0.076 with the frontoparietal network (FPN) having a lowest median strength while the ventral attention network (VAN) had the greatest. A one-sample t-test revealed that all distributions with the exception of the sensorimotor network (SMN), VAN and language network (LAN) were not significantly different from zero (P>0.05). To account for the inherent variability of intra-network connectivity, imaging data from 100 healthy subjects were each used as a control for every subject and their network strength distributions plotted in FIG. 2D. All control intra-network distributions were significantly different from zero (one-sample t-test, P<0.0001) with median connectivity ranging from 0.35 (FPN)-0.62 (VIS). Every network's distribution in controls was significantly different from the corresponding network in GBM patients (two-sample t-test, P<0.00001). Combining the network ROIs in controls resulted in the expected network connectivity distribution for the ROIs located in tumor regions (FIG. 2F). Calculating the probability of intra-network connectivity values being less than 0.05 from this distribution resulted in 0.074 as a threshold to denote normal connectivity in GBM patients. Of the 466 ROIs used to create the GBM intra-network distribution, 200 ROIs (approximately 42.9%) were greater than this threshold (FIG. 2E). Of the 53 patients with intratumor ROIs, 44 (83%) had at least 1 ROI surpassing this threshold.

Figure 3A:
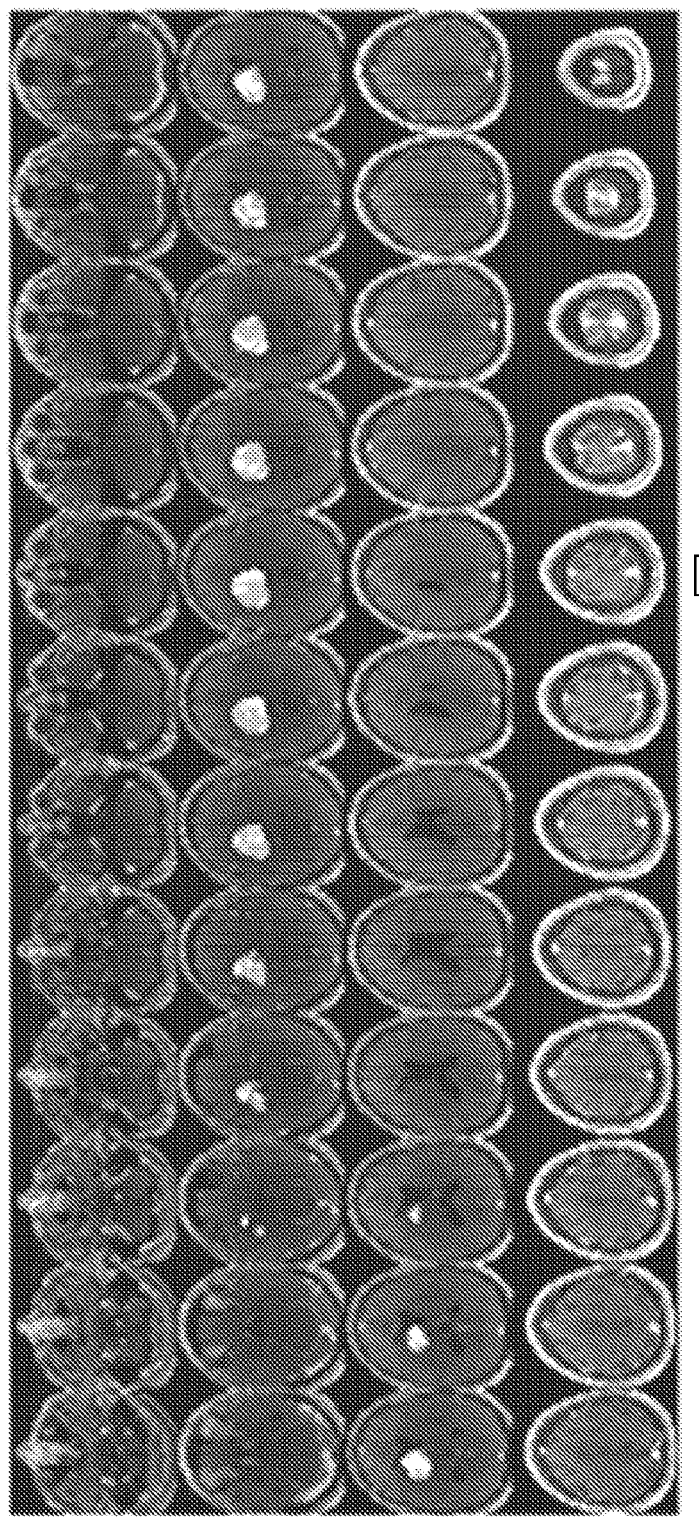
FIG. 3A contains a series of images showing voxelwise functional connectivity (FC) found within an exemplary GBM tumor for a plurality of image slices. Yellow denotes voxels that were assigned FC after obtaining a correlation>0.3 with at least one resting-state network. Orange denotes voxels that did not meet this criterion (no FC).
Figure 3B:
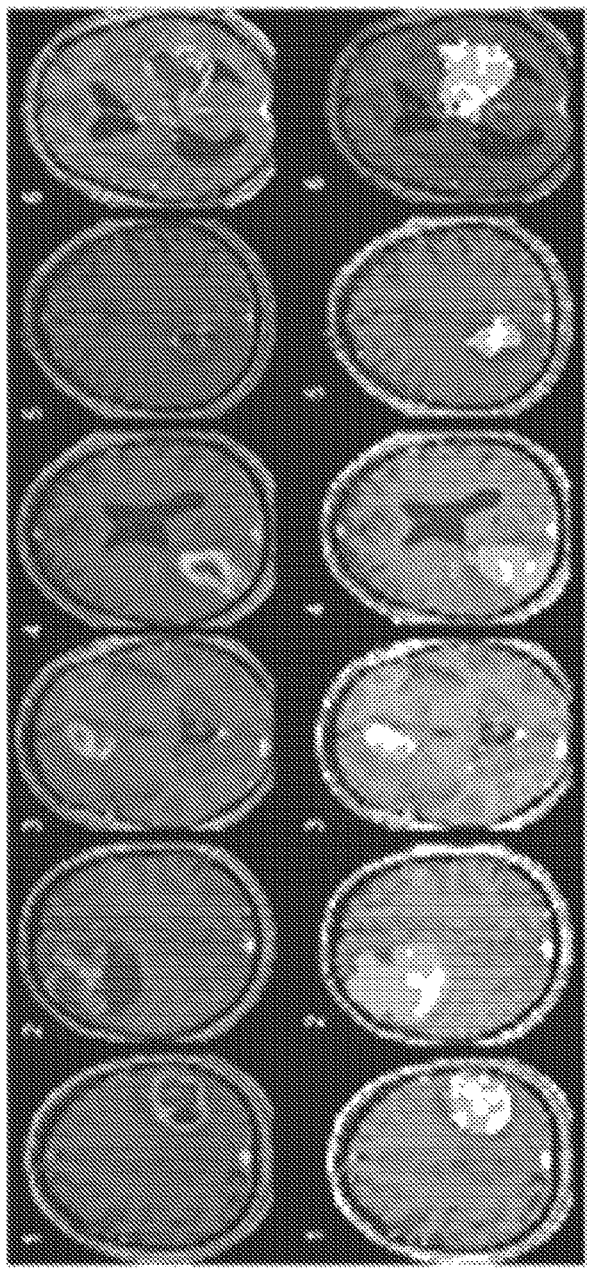
FIG. 3B contains a series of images showing post-contrast T1w slices and corresponding intratumor FC maps of 6 GBM patients highlighting tumor and intratumor function heterogeneity.
Figure 3C:
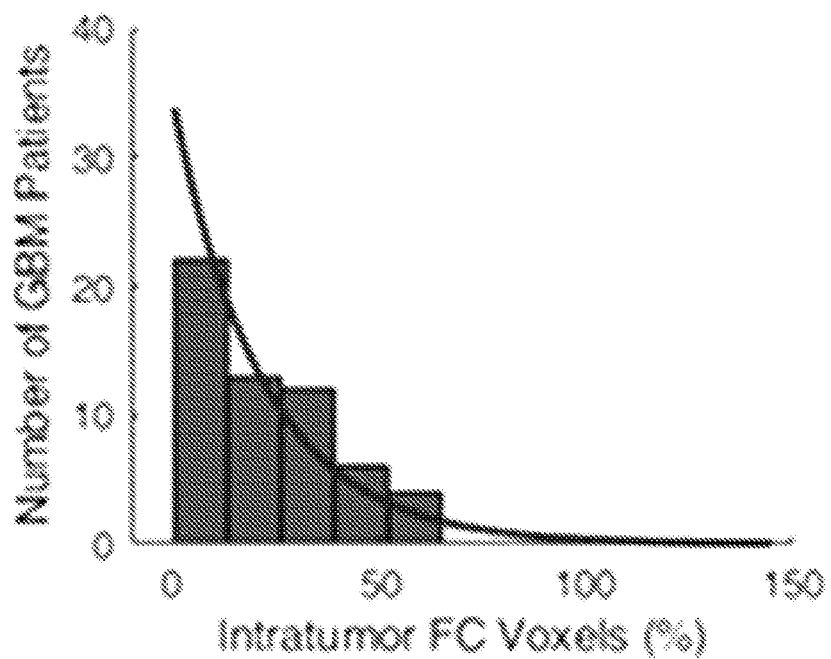
FIG. 3C is a graph showing the distribution of the percentage of intratumor FC voxels by number of patients that reveals a 1/f power law decay with most patients having a low proportion of functional voxels.
Figure 3D:
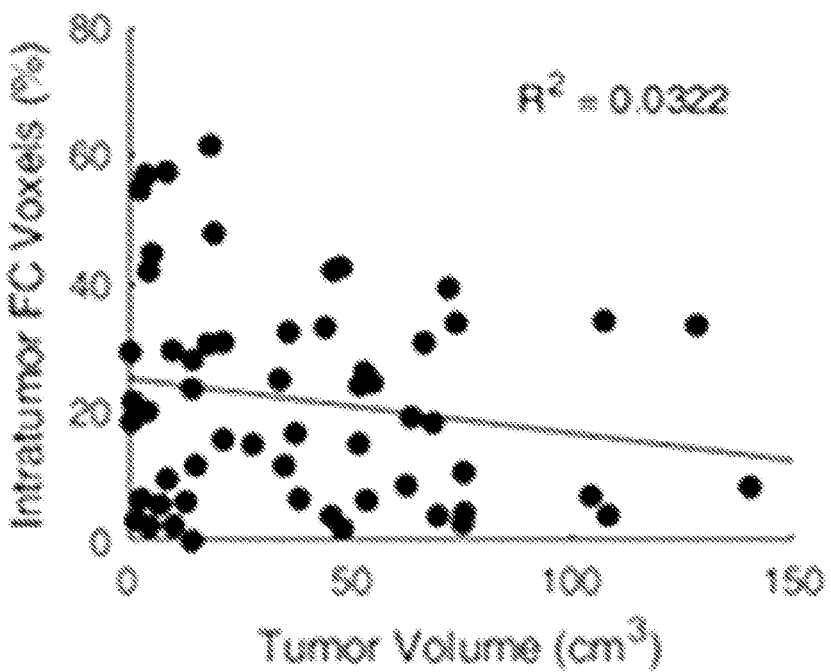
FIG. 3D is a graph showing the percentage of intratumor FC voxels as a function of tumor volume.
Figure 3E:
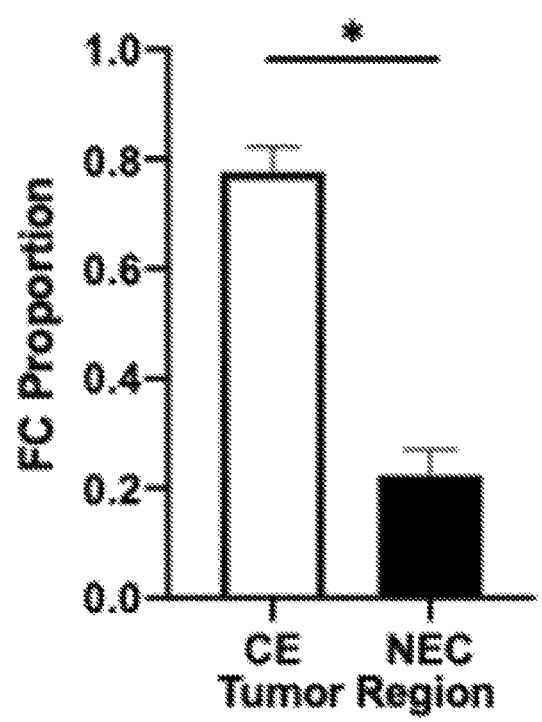
FIG. 3E is a graph of FC Proportion as a function of CE Tumor and NEC Region.

To investigate the prevalence of function on a voxelwise basis, the network-specific time series obtained using the extratumoral ROIs were correlated with all the voxels identified within the contrast-enhanced GBM boundaries. A voxel was assigned as having functional connectivity if its correlation strength to any of the seven networks was greater than 0.3. Approximately 98.3% (n=56) of patients had functionally assigned intratumor voxels using this method. FIG. 3A showcases the complete voxelwise functional connectivity results for 1 GBM patient. Approximately 32.5% of intratumor voxels in this patient surpassed the threshold for functional connectivity. FIG. 3B highlights 6 GBM patients with the top row comprising of post-contrast T1w images while the bottom row revealed the corresponding tumor regions that were assigned functional connectivity (FC) and unassigned regions (No FC) at the representative slices. The variability of tumor location and morphology is also showcased in the intratumor regions that are assigned as having functional connectivity. As demonstrated in FIG. 3C, the majority of patients (n=29) had less than 20% of their tumor mass consisting of functionally assigned voxels while the tumors of 7% (n=4) of patients had function assigned to more than 50% of their mass. To determine the relationship between the proportion of functionally connected intratumor voxels and tumor size (as defined by the volume within and including the contrast-enhanced boundaries), a linear regression was performed (FIG. 3D) revealing a negative trend however; this finding was not statistically significant ($R^2$=0.0322, P=0.182).

ii) Strength of GBM Intratumor Functional Connectivity is Prognostic of Survival, Independent of Clinical and Molecular Factors To determine whether any association between intratumoral functional connectivity and patient outcomes existed, those patients with a priori intratumor ROIs and available overall survival data (n=33) were further analyzed as described below. Characteristics of the patient population analyzed to assess the relationship between intratumor functional connectivity and patient survival are summarized in Table 2 below. This analysis was conducted using both ROI-based and voxel-based intratumor FC measures. In both cases, the patients were median split into Low FC and High FC groups and survival data were compared using the Wilcoxon rank sum test and Kaplan-Meier survival analysis.

TABLE 2

Summary demographics of GBM patients with reported overall survival
Summary of Characteristics

| No. of patients | 31 |
| --- | --- |
| Mean age in years (range) | 61.4 ± 10.2 (27.9-80.8) |
| Sex | |
| Male | 23 |
| Female | 8 |
| CE volume (cm³) | 39.2 ± 32.2 |
| FLAIR volume (cm³) | 103.8 ± 63.2 |
| KPS, n(%) | |
| >70% | 10 (32) |
| Missing | 0 |
| EGFR Amplification | |
| Positive | 10 |
| Negative | 11 |
| Missing | 10 |

TABLE 2-continued

Summary demographics of GBM patients with reported overall survival
Summary of Characteristics

| Extent of resection | |
| --- | --- |
| Gross-total | 11 |
| Subtotal | 20 |
| Biopsy | 0 |
| Laser | 0 |
| MGMT status | |
| Methylated | 9 |
| Non-methylated | 22 |
| Missing | 0 |
| IDH mutation | |
| Mutated | 0 |
| Wild type | 31 |
| Missing | 0 |

CE = contrast enhancement;
FLAIR = peritumoral fluid attenuated inversion recovery hyperintensity;
Mean values are presented with SDs The median intra-network connectivity strength of the ROIs found in each patient's tumor was calculated. The patients were then median split into high functional connectivity (High FC) and low functional connectivity (Low FC) subgroups (FIG. 4A). The nonparametric Wilcoxon rank sum test was performed to compare the overall survival distributions of both groups with the High FC having a significantly greater survival median at 15.51 months compared to the median of Low FC at 8.35 months (right-tailed Wilcoxon rank sum, rank sum=324, Z=3.901, P<0.0005). The two FC groups were further evaluated using Kaplan-Meier survival analysis (FIG. 4B). A log-rank test also revealed that the difference in the two survival curves was significant (P<0.0001).

For the voxelwise analysis, each intratumor voxel was assigned a value equal to the maximum FC over the 7 canonical RSNs. The voxel-based FC measure then was evaluated as the median intra-network FC over all the voxels in each patient's tumor. Median survival times for the High FC and Low FC groups were 14.1 months and 10.5 months, respectively (FIG. 4C). This difference was not significant (right-tailed Wilcoxon rank sum, W=281, p=0.11, Bonferroni corrected). Similarly, the Kaplan-Meier analysis showed a modest difference in survival times (longer survival in the High FC group by log-rank test, p=0.084, Bonferroni corrected) (FIG. 4D).

To control for the potential effects of clinical and demographic covariates on survival, multivariate cox regression was performed, as summarized in Table 3 below.

TABLE 3

Univariate and multivariate survival analysis - ROI FC only

| | Univariate Cox | | Multivariate Cox |
| --- | --- | --- | --- |
| Characteristic | HR (95% CI) | P value | HR (95% CI) |
| Age at initial diagnosis | 1.005 (0.959, 1.053) | 0.844 | 1.002 (0.960, 1.047) |
| Gender = male | 1.136 (0.481, 2.684) | 0.771 | 1.081 (0.370, 3.161) |
| CE volume (cm³) | 1.017 (1.005, 1.028) | 0.00377 | 1.017 (0.998, 1.035) |
| FLAIR volume (cm³) | 1.009 (1.002, 1.015) | 0.00972 | 0.999 (0.988, 1.011) |
| MGMT = methylated | 1.174 (0.534, 2.58) | 0.690 | 0.671 (0.168, 2.677) |

TABLE 3-continued

Univariate and multivariate survival analysis - ROI FC only

| Characteristic | Univariate Cox | | Multivariate Cox |
|---|---|---|---|
| | HR (95% CI) | P value | HR (95% CI) |
| EGFR = amplified | 0.572 (0.257, 1.275) | 0.172 | |
| KPS >70 | 0.330 (0.13, 0.84) | 0.020 | 0.290 (0.099, 0.847) |
| Intratumor FC = High | 0.252 (0.110, 0.575) | 0.00108 | 0.245 (0.089, 0.675) |
| Resection = Total | 0.770 (0.355, 1.667) | 0.507 | 0.918 (0.356, 2.365) |

The categorical variables of interest (Resection extent and MGMT) were each stratified into two groups to increase the statistical power for comparison. For example, laser and subtotal resections (n=20), non-methylated MGMT (n=21) and MGMT missing (n=1) were correspondingly grouped together to compare with the statuses of interest. Despite the addition of covariates, a persistent significant effect of intratumoral FC was prognostic of overall survival (HR: 0.25, 95% CI: 0.089-0.68, P=0.00658). Also notable is the effect of Karnofsky Performance Score (KPS) on survival, with higher KPS (>70) scores prognostic for improved survival (HR: 0.29, 95% CI: 0.099-0.85, P=0.0236).

Additional multivariate Cox regressions of ROI-based FC and voxel-wise FC results were performed to control for potential influences of clinical and demographic covariates, e.g., performance status, on survival times, as summarized in Table 4.

TABLE 4

Multivariate survival analysis - ROI FC vs Voxel-wise (VW) FC

| Characteristic | Multivariate Cox (ROI FC) | | Multivariate Cox (VW FC) | |
|---|---|---|---|---|
| | HR (95% CI) | p value | HR (95% CI) | p value |
| Age at initial diagnosis | 0.996 (0.96, 1.03) | 0.79 | 0.97 (0.93, 1.02) | 0.25 |
| CE volume (cm³) | 1.02 (1.01, 1.03) | 0.0044 | 1.02 (1.01, 1.04) | 0.00095 |
| KPS >70 | 0.31 (0.12, 0.82) | 0.018 | 0.35 (0.13, 0.92) | 0.034 |
| Intratumor FC (ROI) = High | 0.29 (0.12, 0.66) | 0.0035 | | |
| Intratumor FC (VW) = High | | | 0.33 (0.13, 0.84) | 0.021 |

Patients with high postoperative Karnofsky Performance Status (KPS>70) had longer survival times (HR: 0.31, 95% CI: 0.012-0.82, p=0.018), in accordance with previously reported results[26]. The ROI-based FC measure remained prognostic of overall survival after inclusion of demographic covariates (HR: 0.29, 95% CI: 0.12-0.66, p=0.0035). The range of effect sizes was similar for intratumor ROI-based FC and KPS but intratumor FC was a stronger predictor of survival. Univariate Cox regression showed that intratumor voxelwise FC was a significant predictor of survival and this effect was maintained with inclusion of age, tumor size and KPS as covariates (HR: 0.33, 95% CI: 0.13-0.84, p=0.021).

Figure 12:
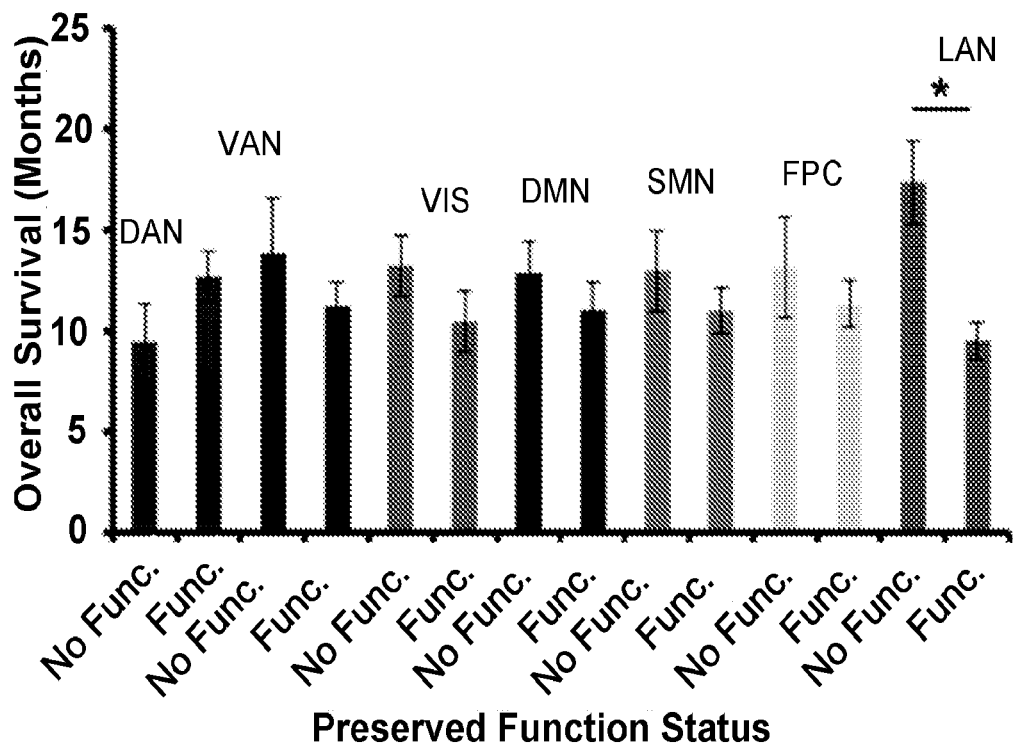
FIG. 12 is a bar graph comparing overall survival in GBM patients by the presence of functional voxels within the contrast enhancement boundaries grouped by RSNs. * denotes p<0.05 significant differences between patients with and without functional voxels corresponding to the same network.

To assess the relationship between preservation of functional tissue from each resting-state network within tumor regions and patient survival, the following additional experiments were conducted. For each of the seven resting-state networks, patients were assigned to one of two groups: a functional group if voxels belonging to this network were found within their tumors and a no-function group if voxels belonging to this network were not found within the tumors. The mean overall survival was obtained for each group for all networks. Apart from the dorsal attention network, all networks showed a greater overall survival when their respective functional voxels were not found within the tumor, as summarized in FIG. 12. However, only the language network findings achieved significance (p=0.002).

Figure 13:
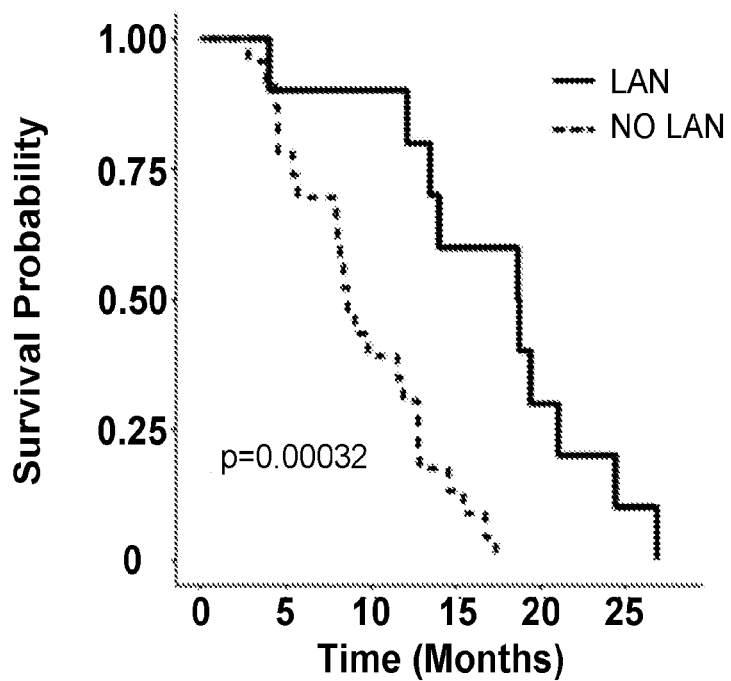
FIG. 13 is a graph comparing Kaplan-Meier survival curves for GBM patients with or without functional LAN voxels within tumors. Patients with LAN voxels within tumors had a significantly shorter overall survival than those with no LAN voxels (HR: 18.7, 95% CI: 3.9-90.5, p=0.0003).
Figure 15:
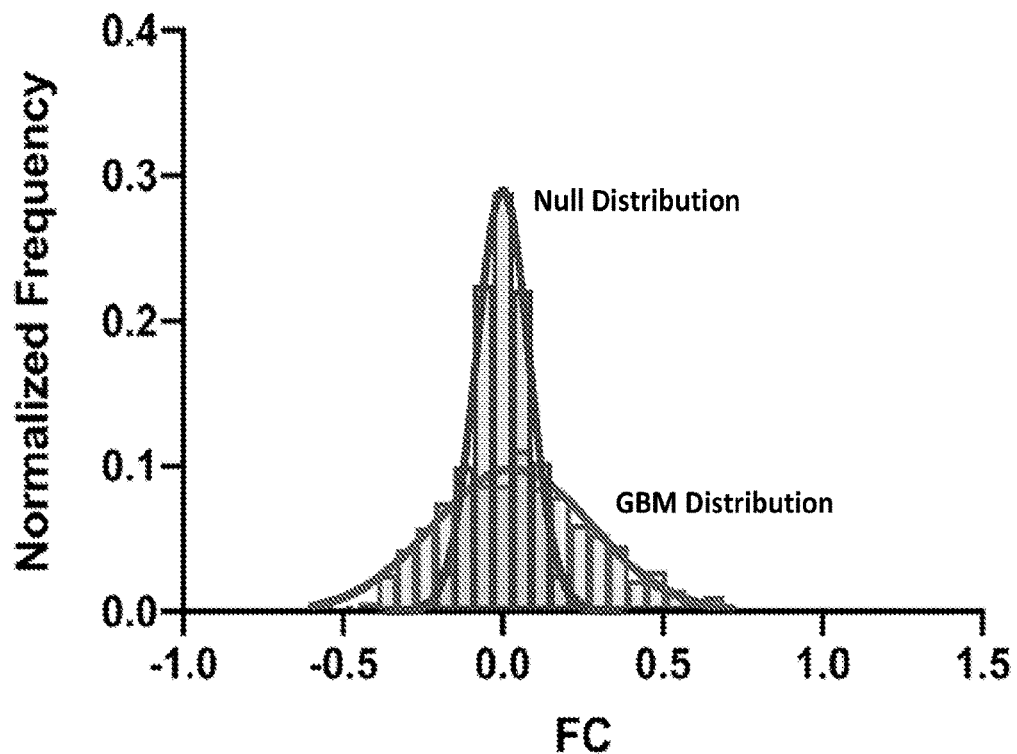
FIG. 15 is a histogram comparing the distribution of functional connectivity in non-functional tissue (null distribution) to the distribution of functional connectivity in the tumor tissues of GBM patients.

In order to determine whether the survival difference between the function and no function groups of the language network was random, permutation resampling (n=10,000 times) was performed and indicated that the observed difference was significant (p<0.001). As a result, the two language network groups were further evaluated using Kaplan-Meier survival analysis, the results of which as illustrated in FIG. 13. A log-rank test revealed that the difference in the two curves was significant (p=0.00032) with the function group having a median survival approximately 10 months shorter than the no-function group (8.64 months vs 18.78 months respectively). To control for the potential effects of clinical and demographic covariates on survival, multivariate cox regression was performed, shown summarized in Table 5 below.

TABLE 5

Multivariate survival analysis

| Prognostic Factor | Overall Survival | |
|---|---|---|
| | HR (95% CI) | p value |
| Age | 1.021 (0.965-1.081) | 0.48 |
| Gender | 4.1323 (1.023-16.663) | 0.046 |
| Resection | 0.810 (0.344-1.909) | 0.63 |
| CE volume | 0.989 (0.966-1.012) | 0.35 |
| FLAIR volume | 1.005 (0.994-1.016) | 0.40 |
| MGMT methylation | 1.798 (0.533-6.068) | 0.34 |
| EGFR amplification | 1.379 (0.536-3.547) | 0.51 |
| Intratumor LAN | 18.668 (3.851-90.494) | 0.0003 |

Categorical variables of interest (Resection extent, MGMT and EGFR) were each stratified into two groups to increase the patient numbers for comparison. For example, laser (n=3) and subtotal resections (n=18), non-methylated MGMT (n=22) and MGMT missing (n=1) and negative EGFR amplification (n=13) and EGFR missing (n=9) were correspondingly grouped together to compare with the statuses of interest. Despite the addition of covariates, a persistent significant effect of intratumoral language function was prognostic of overall survival (HR: 18.7, 95% CI: 3.9-90.5, p=0.00028). Also notable was the effect of gender on survival, with female patients having worse outcomes (HR: 4.1, 95% CI: 1.02-16.7, p=0.046).

iii) Intratumor Spectral Analyses Suggest Altered BOLD Signal Power

Figures 5A, 5B:
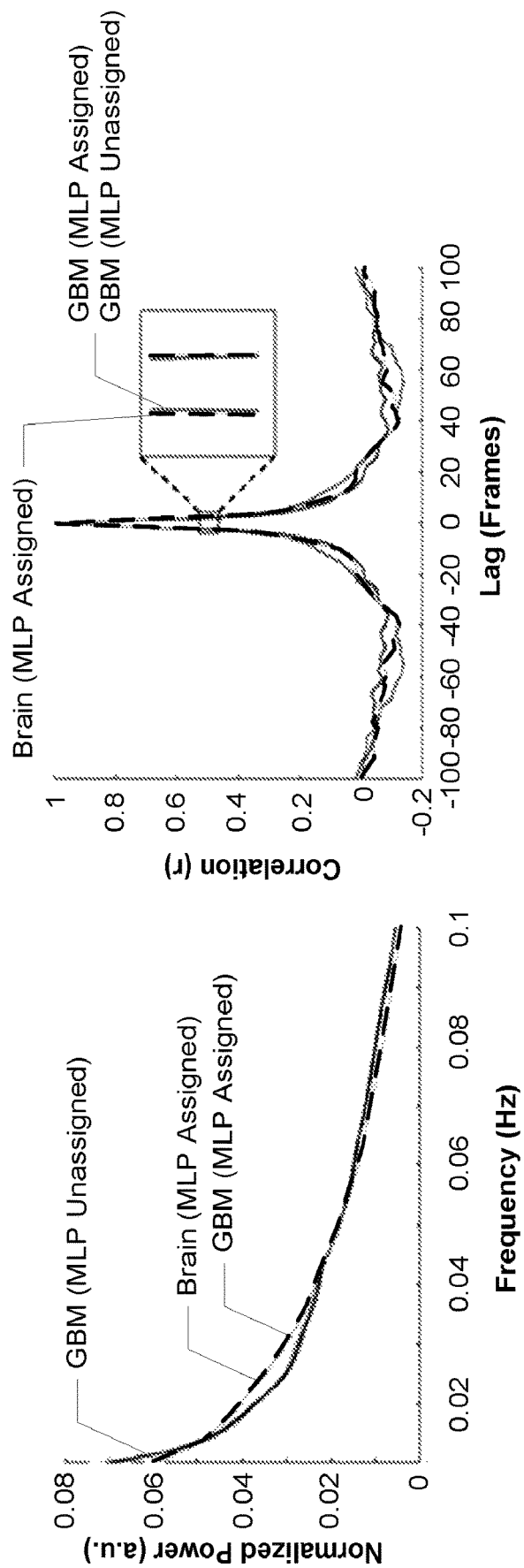
FIG. 5A (was supplementary FIG. 1A) is a graph showing power spectra of average MLP-assigned tumor voxels (red line), average MLP-unassigned tumor voxels (black line) and average MLP-assigned brain voxels outside of tumor and peritumoral edema regions (green line) for GBM patients (n=56). All signals appear to follow a 1/f power law relationship. However, for frequencies greater than 0.06 Hz, the power of brain signals are consistently lower than the power of tumor derived signals.
FIG. 5B (was supplementary FIG. 1B) is a graph showing the autocorrelation of average MLP-assigned tumor voxels (red line), average MLP-unassigned tumor voxels (black line) and average MLP-assigned brain voxels outside of tumor and peritumoral edema regions (green line) for GBM patients (n=56). Full-width half max analysis indicates significant difference between unassigned tumor regions compared to assigned brain regions but no differences are found between those regions and assigned tumor voxels.

The BOLD spectra obtained within GBM tumors for both MLP-assigned and MLP unassigned voxels were not significantly different from each other at any frequency (FIG. 5A). Although these signals appeared to follow a 1/f power law relationship, spectral power significantly differed from normal MLP-assigned brain voxels outside of peritumoral boundaries at several frequency bins. At the frequency bin 0.02-0.03 Hz, the total power obtained from normal MLP-assigned brain voxels was significantly higher than within tumor MLP-assigned voxels (0.171±0.026 Hz vs 0.152±0.022 Hz; t-stat=−4.12, P<0.0001), whereas this relationship reversed for all bins in the range 0.06-0.1 Hz (P<0.05). The full-width half max (FWHM) of the autocorrelations of the MLP-assigned and unassigned intratumor voxels were also compared with the MLP-assigned brain voxels outside the peritumoral regions (FIG. 5B). A Wilcoxon rank sum test revealed significant differences in the FWHM of unassigned tumor regions compared to assigned brain regions (4.17 frames vs 5.74 frames, Z=−2.9157, P=0.0035) but neither were significantly different from MLP-assigned tumor voxels at 4.97 frames.

Example 2: Prediction of Survival Duration by Machine Learning Analysis of Functional Connectivity in Glioblastoma Multiforme Patients To demonstrate the predictive value of the magnitude of whole brain functional connectivity (FC) measured in glioblastoma multiforme patients with respect to patient survival, the following experiments were conducted.

A. Methods i) Patient Population

Sixty-four patients who underwent evaluation before surgical resection and satisfied inclusion and exclusion criteria as described below were included in this study. Inclusion criteria included patients newly diagnosed with a brain tumor and demonstrated a clinical need for a structural magnetic resonance imaging (sMRI) scan and resting-state functional magnetic resonance imaging (rs-fMRI) as determined by the treating neurosurgeon. Exclusion criteria included patients aged less than 18 years, and no prior surgery for a brain tumor.

Patients were classified into two groups using a cut off (threshold) of 12.5 months after the first surgery date. The 12.5-month threshold was selected as representative of a mean survival rate of GBM patients. Patients who survived less than 12.5 months (<435 days) were grouped as short-term survival (STS) patients. Those who survived at least 435 days were assigned to the long-term survival (LTS) group. Wilkson rank-sum test was performed to assess the differences in age, if any. There was no significant difference in age between these two groups (Wilcoxon rank sum test, p>0.05). Demographic information patients are shown in Table 6.

TABLE 6

Demographic and Clinical characteristics of GBM patients

| Variable | Short-term survival (STS) (<435 days) | Long-term survival (LTS) (≥435 days) |
|---|---|---|
| Participants | 35 | 29 |
| Sex (M/F) | 21/14 | 24/5 |
| age (in years) (mean ± std) | 62.5 ± 11.90 | 58.6 ± 9.00 | ii) MRI Acquisition

The imaging was performed on a Siemens 3T Trio or Skyra MRI scanner. Patients were scanned using a standard clinical presurgical tumor protocol. T1-weighted images (MPRAGE; magnetization prepared rapid acquisition gradient echo) and T2-weighted images (fast spin-echo), acquired as part of tumor protocol structural imaging, were used in resting-state processing. The rs-fMRI data were acquired using an echo-planar imaging sequence (voxel size=3 mm cubic; echo time (TE)=27 ms; repetition time (TR)=2.2-2.9 s; field of view=256 mm; flip angle=90°) for a total of 320 frames. While scanning the patients were instructed to remain still and fixate on a visual cross-hair without falling asleep.

iii) Resting State Functional Connectivity (rsFC) Analysis

Standard preprocessing procedures were used as described in Example 1. Preprocessing included slice timing correction, removal of systemic odd-even slice intensity differences due to interleaved acquisition, and head motion correction within and across runs. Atlas transformation was achieved by the composition of affine transforms connecting the functional imaging volumes with the T2-weighted and T1-weighted structural images, resulting in a volumetric time series in isotropic 3 mm$^3$ atlas space. Additional preprocessing included spatial smoothing (6 mm full-width half-maximum Gaussian blur in each direction), voxel-wise removal of linear trends over each run, and temporal low pass filtering retaining frequencies less than 0.1 Hz. The spurious variance was reduced by regression of nuisance waveforms derived from head motion correction and extraction of the time series from regions of white matter and cerebrospinal fluid. The whole-brain (global) signal was included as a nuisance regressor. Frame censoring was performed to minimize the impact of head motion on the correlation results. Thus, frames (volumes) in which the root mean square (evaluated over the whole brain) change in voxel intensity relative to the previous frame exceeded 0.5% (relative to the whole-brain mean) were excluded from the functional connectivity computations.

Upon completion of preprocessing, voxel specific time courses of blood-oxygen-level-dependent (BOLD) signals were sampled at each region of interest (ROI) level by taking an average within each ROI and used as a 'reference' time course. The rsFC between any two ROI pairs was then defined in terms of the Pearson's correlation coefficient between mean BOLD time courses in subject level. A set of 300 ROIs were sampled and analyzed in this manner. The 300 spherical ROIs included 264 volumetric ROIs as well as subcortical and cerebellar ROIs; the ROI included 239 cortical, 34 subcortical, and 27 cerebellar volumetric ROIs. The mean time series of the 300 ROIs were reordered so that parcels were grouped based on their membership in one of thirteen specific resting-state networks (RSN) and cerebral region's ROIs. The thirteen groups were cingulo-opercular network (CON), frontoparietal network (FPN), dorsal attention network (DAN), ventral attention network (VAN), salience (SAL) network, somatomotor dorsal (SMD) network, somatomotor lateral (SML) network, visual (VIS) network, auditory (AUD) network, Medial Temporal Lobe (MTL) network, Reward (REW) network, parietomedial (PMe) network, default-mode (DMN) and Cerebral regions (all cerebral ROIs). ROIs that were not assigned to any community (unassigned ROIs) were excluded from further analysis, leaving 288 ROIs. For each subject of the study, a 288×288 functional connectivity matrix was computed. None of the ROIs was excluded based on overlap on tumor or community membership.

iii) Machine Learning-Assisted Classification

The caret-package available in R was used to implement the machine learning algorithms. A support vector machine (SVM) classifier with a linear kernel was used for classification of the functional connectivity matrices, due to the well-established predictive power of SVMs with relatively small sample sizes.

To evaluate the performance of the SVM classifier, a leave one out (LOO) method was used, due to limited sample size. Data preparation for the SVM and classification analysis were performed as described below.

Feature Extraction and Selection

Each 288×288 functional connectivity matrix included a total of 41,328 Pearson's correlation coefficients (rsFC) from all possible combinations of the 288 ROIs after excluding self-comparisons (i.e. diagonal elements) and symmetric comparisons (i.e. upper triangle elements). This high dimensionality of ROI-to-ROI rsFCs, also referred to herein as "features" was much higher than the number of patient samples (N=64). To enhance the performance of the SVM model and to reduce the possibility of overfitting, the number of features in each functional connectivity matrix were further reduced using a dimensionality reduction (feature selection) approach, described below.

Feature selection was performed in two steps prior to training-the SVM model. For each feature level a hybrid feature selection procedure that combined a correlation test between survival days and rsFC, with the SVM-based feature selection approach was used. Those features with a p-value smaller than a predefined threshold ($p \leq 0.05$, uncorrected) were retained in a reduced rsFC dataset. The reduced rsFC dataset was subjected to recursive feature elimination (RFE) with 4-fold cross-validation repeated 10 times (nested) to extract the patterns from the training dataset while ranking the features according to importance. The number of features selected for use with the SVM-classifier was based on the cross-validated AUC. The maximum number of features was limited to 60 to avoid overfitting. All procedures of feature selection described above were constrained to the training data, without using the information of the test data (in this case of LOO, the holdout subject) to avoid the introduction of bias.

Model Training and Performance Testing

In accordance with the leave one out (LOO) method, the data of all subjects except one (the left-out/test subject) was used to train the SVM model. Cost, one of the main parameters of the linear SVM, was estimated using the grid-search algorithm at the scale of c=1:10. After the grid-search, the best performing cost was used in the final model. Furthermore, to generalize the training process and obtain a more accurate model, a 4-fold (K=4, given the data size) cross-validation approach was used. This technique divided data into equal disjointed subsets of size 4. The model being evaluated was then trained on all folds except one. The remaining one-fold was reserved for testing purposes. This process was then repeated 3 times (K−1), selecting each fold to be used for testing once. Before feeding the data to the machine learning algorithms, features were normalized to zero mean and unit variance. The final model formed as described above was used to predict the group of the test subject (i.e. left-out subject).

The LOO procedure described above (i.e. train a model and the test using left out data) was repeated using each of the remaining subjects as the test/left-out subject. To ascertain the performance of the classifier, accuracy, specificity and sensitivity values were calculated as defined in Table 7 below.

TABLE 7

Confusion matrix.

| | Actual Positives | Actual Negatives |
|---|---|---|
| Positive Prediction | True Positives (TP) | False Positives (FP) |
| Negative Prediction | False Negatives (FN) | True Negatives (TN) |

Using the definitions summarized in Table 7, accuracy percentage (%), defined herein as the ratio of the number of accurately classified subjects to the total number of subjects, was calculated according to the equation:

(TP+TN)/(TP+TN+FP+FN).

Sensitivity, defined herein as the proportion of the correctly classified positive sample, or true positive rate, was calculated according to the equation:

TP/(TP+FN)

Specificity defined herein as the proportion of correctly classified negative sample or true negative rate, was calculated according to the equation:

TN/(TN+FP)

To evaluate overall model performance, an area under the ROC (Receiver Operating Characteristics Curve) analysis, more commonly referred to as AUC, was performed.

B. Results

Figure 17:
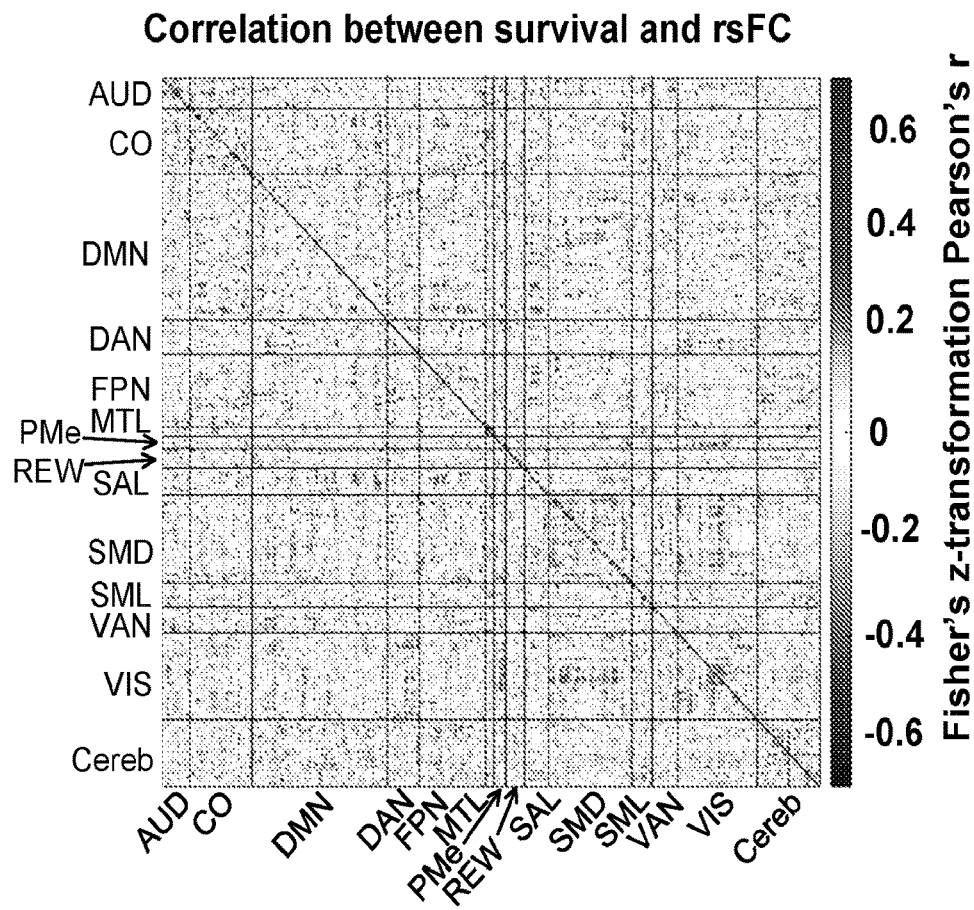
FIG. 17 is a heat map summarizing correlations between survival duration and the mean rsFC data of FIG. 16, with matrix elements arranged and annotated similarly to FIG. 16.

A heat map summarizing the mean temporal correlation matrix of the 64 patients is provided in FIG. 16. The heat map of FIG. 16 illustrates patterns of resting state functional connectivity averaged over the entire GBM patient population. A heat map summarizing the correlation between the functional connectivity within the patient's brain and patient survival time is provided in FIG. 17. To construct the elements of the heat map of FIG. 17, the correlation between rsFC and survival days was computed for each feature of the correlation matrix of FIG. 16. As seen in FIG. 17, many of the features showed very high correlation with survival days, either positive or negative. For the visualization purpose, we used all subject data. However, only those features with p<0.05 (uncorrected and using only the test set of data) were selected for the machine learning related analysis using the hybrid feature selection procedure described above.

Table 8 summarizes the performance of the machine learning classification of short versus long-term survival of GBM patients as described above. Within-patient classification accuracy was 71.88%, and sensitivity and specificity were 77.14% and 65.52% respectively. The AUC value was 0.752 (95% CI, 0.62-0.88).

TABLE 8

Performance of SVM Classifier

| SVM (LOO) | Accuracy | Sensitivity | Specificity | AUC | C |
|---|---|---|---|---|---|
| STS vs LTS | 71.88% | 77.14% | 65.52% | 0.752 | 1 |

Figure 18:
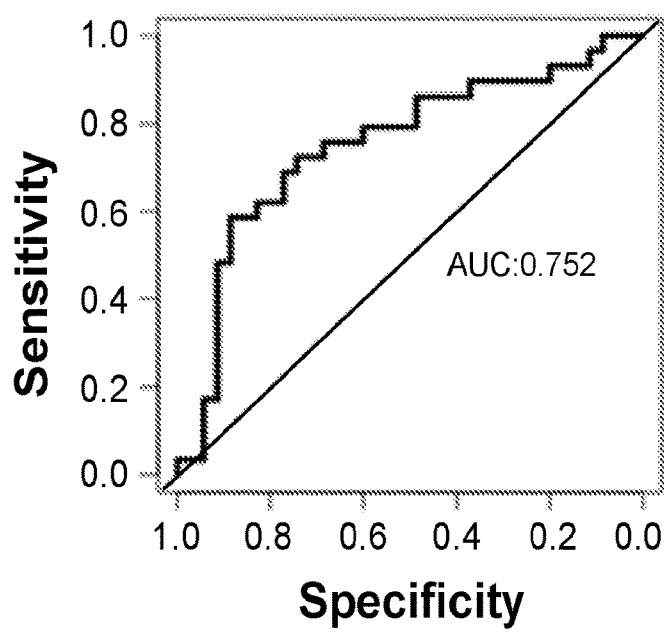
FIG. 18 is a graph summarizing the ROC analysis of the classification of short-term survivors and long-term-survivors using machine learning in accordance with an aspect of the disclosure.

FIG. 18 is a graph of the receiver operating characteristic (ROC) curves for stratifying patients. Since the feature selection in each iteration was performed based on the training set the selected features may differ across iterations. Although the grid-search algorithm at the scale of c=1:10 was used to optimize C as described above, all selected C values were 1.

Statistical significance of the classification accuracy and area under the curve (AUC) were tested using permutation testing with 100 permutations. Each subject's class (group) was randomly assigned. The resulting accuracy produced a null-hypothesis distribution that can be used to calculate the p-value of the corresponding accuracies (i.e. the proportion of permutations that yielded a greater accuracy than the accuracy found for the classification/regression models). The findings, shown summarized in Table 9, demonstrated robust predictions for determining whether patients would be a long-term survivor versus a short-term survivor.

TABLE 9

Classification performance (mean of 100 iterations) of SVM classifier.

| Method | Mean of 100 iterations (mean % ± sd) (Cutoff = 14.5 months) | | | |
|---|---|---|---|---|
| | Accuracy | Sensitivity | Specificity | AUC |
| SVM (linear) | 97.4 ± 0.032 (p = 0.001) | 96.6 ± 0.055 (p = 0.230) | 98.2 ± 0.046 (p = 0.005) | 0.99 ± 0.009 (p = 0.001) |

In addition, the SVM model was used to predict the survival duration of a group of GBM patients based on rsFC matrices produced as described above. As illustrated above, the SVM model FIG. 21 is a graph comparing the number of survival days predicted by an SVM model to the actual number of survival days for a group of GBM patients; a linear regression is superimposed over individual patient data The results of these experiments demonstrated that patients with GBM can be partitioned into short-term surviving and long-term surviving using features extracted from resting-state fMRI data using a machine learning classifier, and the potential of rsFC as a biomarker for GBM to predict the survival, regardless of heterogeneity tumor pathologies (including tumor size, location, patient's age and sex, etc.).

Example 3: Machine Learning Analysis of Functional Connectivity in Healthy Controls and Glioblastoma Multiforme Patients To explore the impact of glioblastoma multiforme (GBM) on the features (correlation strengths) of the resting state functional connectivity (rsFC) correlation matrix produced using the methods described in Example 2, the following experiments were conducted.

The heterogeneity of tumor pathologies in GBM patients may impact the availability of a sufficient number of features in the rsFC correlation matrix to uniquely characterize the tumor pathology regardless of the noise induced by various factors such as tumor size, tumor location, age/sex of the patient, and any other potentially confounding factor.

The methods of machine learning analysis of resting state functional MRI data described in Example 2 were used to analyze data obtained from healthy control subjects (HC, N=64) data. The results obtained from the HC subjects were compared with the results obtained for all GBM patients (N=64) in both short-term and long-term survival groups.

Figure 19:
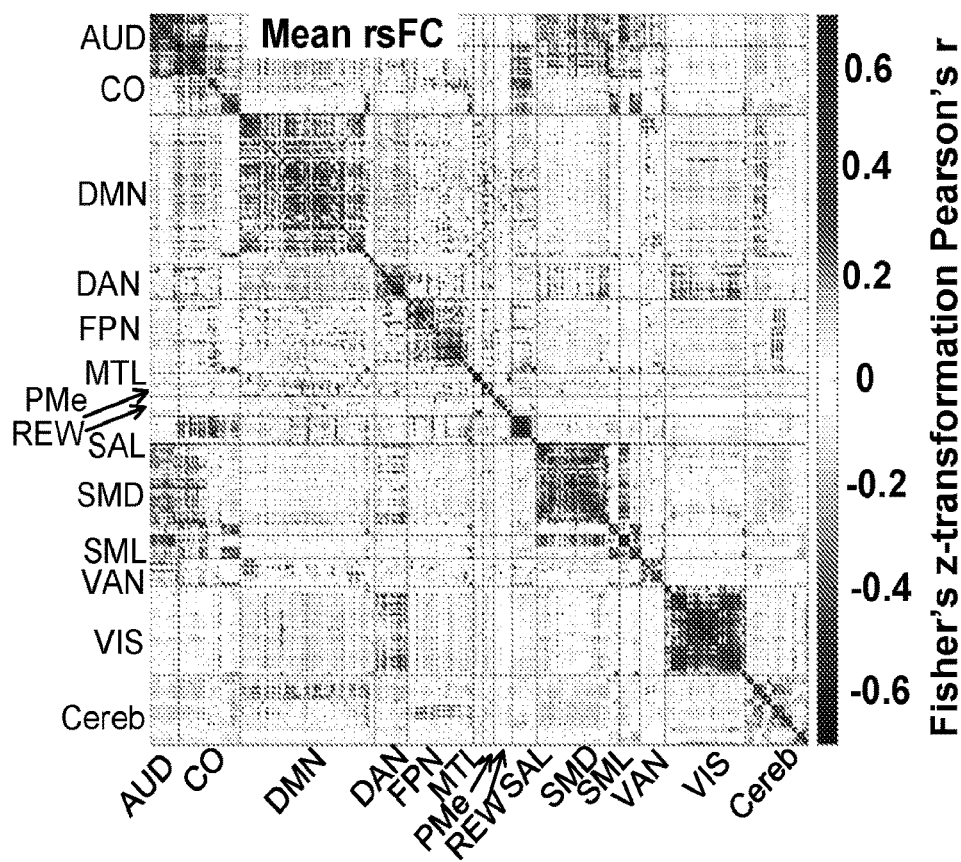
FIG. 19 is a mean rsFC matrix summarizing the mean rsFC between 288 regions of interest (ROIs) in a population of healthy control (HC) subjects, with matrix elements arranged and annotated similarly to FIG. 16.
Figure 20:
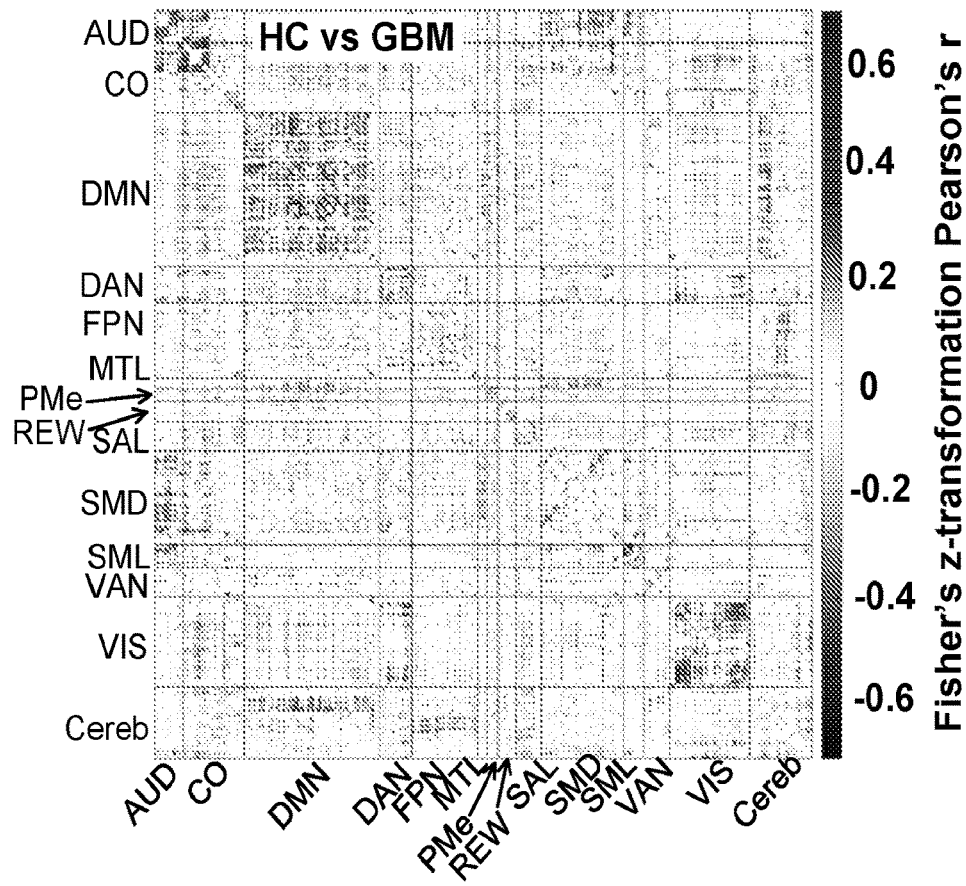
FIG. 20 is a heat map summarizing differences in mean rsFC between HC subjects of FIG. 19 and GBM patients of FIG. 16, with matrix elements arranged and annotated similarly to FIG. 16; positive matrix elements denote mean rsFC of HC>mean rsFC of GBM, p<0.05 uncorrected.

FIG. 19 shows the rsFC correlation matrix for the healthy control (HC) group and FIG. 20 is a matrix summarizing the differences in rsFC of the HC group and the GBM group (combined STS and LTS groups). A Wilcoxon rank sum test was performed to test the group differences of FIG. 20. Out of the 41,328 possible combinations of the 288 ROIs of the correlation matrix, 18361, 12783, 11029, 7984 exhibited significant differences at $p<0.05, 0.01, 0.005, 0.001$ (uncorrected) respectively. 2218 features of the correlation matrix were significantly different at familywise corrected $p<0.05$ (uncorrected $p<-0.00000122$, Wilcoxon rank sum test). The SVM model developed as described in Example 2 was able to correctly classify GBM patients from HC subjects.

The results of these experiments demonstrated that the machine learning-based classification method was robust and capable of differentiating short-term survivors from long-term survivors among GBM patients, as well as differentiating healthy control patients from GBM patients using the same SVM model.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

What is claimed is:

1. A computing device configured to transform a resting-state fMRI dataset of a brain tumor patient into a predicted survival outcome, the computing device comprising a display device, at least one processor, and a non-volatile computer-readable media, the non-volatile computer-readable media containing instructions executable on the at least one processor to:
   a. transform the resting-state fMRI dataset into a functional connectivity matrix comprising a plurality of matrix elements, matrix each element comprising a correlation of resting-state fMRI activities of a first and second region of interest from a plurality of regions of interest within the patient's brain;
   b. transform the functional connectivity matrix into the predicted survival outcome using a machine learning model;
   c. display the predicted survival outcome on the display device; and
   d. provide a brain mapping using the same resting-state fMRI dataset used in providing the predicted survival outcome, wherein the brain mapping is adapted for use in treatment planning.

2. The computing device of claim 1, wherein the correlation of resting-state fMRI activities comprises a Pearson's correlation coefficient.

3. The computing device of claim 1, wherein the brain tumor patient comprises a glioblastoma multiforme patient.

4. The computing device of claim 1, wherein each matrix comprises a correlation strength of resting-state fMRI activities.

5. The computing device of claim 4, wherein the correlation strength comprises a Fisher's z transformed Pearson's correlation strength.

6. The computing device of claim 1, wherein the machine learning model is pre-trained using a training set comprising resting-state fMRI datasets from a plurality of glioblastoma multiforme patients and corresponding survival outcomes.

7. The computing device of claim 1, wherein the predicted survival outcome comprises a classification of the patient as a short-term survivor or a long-term survivor, wherein the short-term survivor indicates a predicted survival of less than a threshold survival term and the long-term survivor indicates a predicted survival of greater than the threshold survival term.

8. The computing device of claim 1, wherein the predicted survival outcome comprises a predicted survival duration of the patient.

9. The computing device of claim 1, wherein the machine learning model transforms the functional connectivity matrix into a predicted survival outcome using at least one of a classification analysis and a regression analysis.

10. The computing device of claim 1, wherein the machine learning model comprises one of a deep convolutional neural network and a support machine vector with a linear kernel.

11. The computing device of claim 1, wherein the non-volatile computer-readable media further contains instructions executable on the at least one processor to recommend a treatment based on the predicted survival outcome.

12. The computing device of claim 1, wherein the treatment for which the brain mapping is adapted for planning comprises resection of a brain tumor.

13. The computing device of claim 1, wherein the treatment for which the brain mapping is adapted for planning comprises at least one of radiation treatment and chemotherapy.

14. The computing device of claim 1, wherein the brain mapping comprises mappings of a set of canonical resting state network ("RSNs") generated using the machine learning model.

15. The computing device of claim 14, wherein the set of canonical RSNs includes at least a sensorimotor RSN ("SMN"), a language RSN ("LAN"), and a vision RSN ("VIS").

16. The computing device of claim 14, wherein transforming the functional connectivity matrix into the predicted survival outcome uses the mappings of the set of canonical RSNs generated using the machine learning model.

17. The computing device of claim 16, wherein transforming the functional connectivity matrix into the predicted survival outcome further comprises determining a boundary of the brain tumor.

18. The computing device of claim 17, wherein transforming the functional connectivity matrix into the predicted survival outcome further comprises evaluating intratumoral resting state functional connectivity.

19. The computing device of claim 18, wherein evaluating intratumoral resting state functional connectivity comprises evaluating functional connectivity of brain tissue residing within the tumor boundary with at least one of the canonical RSNs.

20. The computing device of claim 1, wherein transforming the functional connectivity matrix into the predicted survival outcome further comprises determining a boundary of the brain tumor.

21. The computing device of claim 20, wherein transforming the functional connectivity matrix into the predicted survival outcome further comprises evaluating intratumoral resting state functional connectivity.

22. A computer-implemented method of predicting a survival outcome of a brain tumor patient, the method comprising:

a. receiving, at a computing device, a resting-state fMRI dataset of the brain tumor patient;
b. transforming, using the computing device, the resting-state fMRI dataset into a functional connectivity matrix comprising a plurality of matrix elements, each matrix element comprising a correlation of resting-state fMRI activities of a first and second region of interest from a plurality of regions of interest within the patient's brain;
c. transforming, using the computing device, the functional connectivity matrix into the predicted survival outcome using a machine learning model;
d. displaying the predicted survival outcome on a display device; and
e. providing a brain mapping using the same resting-state fMRI dataset used in providing the predicted survival outcome, wherein the brain mapping is adapted for use in treatment planning.

23. The computer-implemented method of claim 22, wherein the correlation of resting-state fMRI activities comprises a Pearson's correlation coefficient.

24. The computer-implemented method of claim 22, wherein the brain tumor patient comprises a glioblastoma multiforme patient.

25. The computer-implemented method of claim 22, wherein each matrix element comprises a correlation strength of resting-state fMRI activities.

26. The computer-implemented method of claim 25, wherein the correlation strength comprises a Fisher's z transformed Pearson's correlation strength.

27. The computer-implemented method of claim 22, wherein the machine learning model is pre-trained using a training set comprising resting-state fMRI datasets from a plurality of glioblastoma multiforme patients and corresponding survival outcomes.

28. The computer-implemented method of claim 22, wherein the predicted survival outcome comprises a classification of the patient as a short-term survivor or a long term survivor, wherein the short-term survivor indicates a predicted of survival less than a threshold survival term and the long-term survivor indicates a predicted survival of greater than the threshold survival term.

29. The computer-implemented method of claim 22, wherein the predicted survival outcome comprises a predicted survival duration of the patient.

30. The computer-implemented method of claim 22, wherein the machine learning model transforms the functional connectivity matrix into a predicted survival outcome using at least one of a classification analysis and a regression analysis.

31. The computer-implemented method of claim 22, wherein the machine learning model comprises one of a deep convolutional neural network and a support machine vector with a linear kernel.

32. The computer-implemented method of claim 22, further comprising recommending a treatment based on the predicted survival outcome.

* * * * *